(12) United States Patent
Evans et al.

(10) Patent No.: US 11,267,491 B2
(45) Date of Patent: *Mar. 8, 2022

(54) ASSEMBLIES FOR MOUNTING PORTABLE REMOTE CONTROL LOCOMOTIVE (RCL) SYSTEMS TO LOCOMOTIVE HANDRAILING

(71) Applicant: Cattron North America, Inc., Warren, OH (US)

(72) Inventors: Richard Allen Evans, Brookfield, OH (US); Mark Anthony Balent, Youngstown, OH (US); Matthew Adkins, Warren, OH (US)

( * ) Notice: Subject to any disclaimer, the term of this patent is extended or adjusted under 35 U.S.C. 154(b) by 463 days.

This patent is subject to a terminal disclaimer.

(21) Appl. No.: 16/525,153

(22) Filed: Jul. 29, 2019

(65) Prior Publication Data
US 2020/0055527 A1    Feb. 20, 2020

Related U.S. Application Data

(60) Provisional application No. 62/718,589, filed on Aug. 14, 2018.

(51) Int. Cl.
*B61C 17/12* (2006.01)
*B60R 11/00* (2006.01)
(Continued)

(52) U.S. Cl.
CPC .............. *B61C 17/12* (2013.01); *B60R 11/00* (2013.01); *B61L 3/127* (2013.01); *B61L 29/28* (2013.01); *G08B 3/10* (2013.01); *H04R 1/026* (2013.01)

(58) Field of Classification Search
CPC .............. B60R 11/00; B60R 2011/004; B60R 2011/0049; B60R 2011/008; F16M 13/02;
(Continued)

(56) References Cited

U.S. PATENT DOCUMENTS

| 754,503 A | * | 3/1904 | Rubicam et al. .. A47G 25/0678 248/307 |
| 1,219,354 A | * | 3/1917 | Seward ................... F21V 21/08 248/214 |

(Continued)

FOREIGN PATENT DOCUMENTS

| DE | 20013623 U1 | 11/2000 |
| EP | 2295303 A1 | 3/2011 |

(Continued)

OTHER PUBLICATIONS

Extended European Search Report for European application No. 19191260 which names the same inventor and assignee but is not related through a priority claim; dated Mar. 25, 2020, 10 pages.

(Continued)

*Primary Examiner* — Justin M Larson
(74) *Attorney, Agent, or Firm* — Harness, Dickey & Pierce, P.L.C.; Anthony Fussner

(57) ABSTRACT

According to various aspects, exemplary embodiments are disclosed herein of assemblies that may be used for mounting enclosures of portable remote control locomotive (RCL) systems and/or speakers to locomotive handrailing. Also disclosed are exemplary embodiments of portable remote RCL systems mountable to locomotive handrailing by such assemblies. Additionally, exemplary embodiments are disclosed of audible alert systems including speakers mountable to locomotive handrailing by such assemblies.

21 Claims, 29 Drawing Sheets

(51) Int. Cl.
*B61L 3/12* (2006.01)
*B61L 29/28* (2006.01)
*G08B 3/10* (2006.01)
*H04R 1/02* (2006.01)

(58) Field of Classification Search
CPC ....... F16M 13/022; B61C 17/12; B61L 3/127; B61L 29/28; G08B 3/10; H04R 1/026
USPC .......................... 224/29.5, 560; 248/215, 340
See application file for complete search history.

(56) References Cited

U.S. PATENT DOCUMENTS

| | | | | |
|---|---|---|---|---|
| 1,294,916 | A * | 2/1919 | Knight | A47H 7/02 |
| | | | | 211/103 |
| 3,208,704 | A * | 9/1965 | McDowell | G01F 15/18 |
| | | | | 248/68.1 |
| 4,944,434 | A * | 7/1990 | Hamilton | B60R 9/02 |
| | | | | 224/482 |
| 4,949,068 | A | 8/1990 | Johnston et al. | |
| 5,022,538 | A | 6/1991 | Richmond et al. | |
| 5,054,732 | A * | 10/1991 | Sukup | A47F 10/02 |
| | | | | 248/309.1 |
| 5,485,932 | A * | 1/1996 | Romm | A47B 57/50 |
| | | | | 211/103 |
| 6,079,515 | A | 6/2000 | Newman | |
| 6,152,313 | A * | 11/2000 | Klein | A47G 25/06 |
| | | | | 211/113 |
| 6,450,378 | B1 * | 9/2002 | Miller | B60R 7/14 |
| | | | | 224/275 |
| 6,659,412 | B1 * | 12/2003 | Roach | A47G 7/044 |
| | | | | 211/113 |
| 6,659,777 | B1 | 12/2003 | Rondeau | |
| 6,729,485 | B2 | 5/2004 | Ehrgott | |
| 6,941,597 | B2 * | 9/2005 | Hampe | A61G 7/05 |
| | | | | 248/340 |
| 8,028,877 | B2 * | 10/2011 | Lien | B62J 9/27 |
| | | | | 224/417 |
| 8,033,842 | B2 | 10/2011 | Arie et al. | |
| 8,251,331 | B2 * | 8/2012 | Fowler | F16M 13/022 |
| | | | | 248/316.8 |
| 8,479,930 | B1 | 7/2013 | Cohen | |
| 8,550,315 | B2 | 10/2013 | Houser et al. | |
| 8,763,971 | B1 * | 7/2014 | Wilson | A61M 16/021 |
| | | | | 248/340 |
| 8,910,417 | B1 | 12/2014 | Meyers | |
| 9,663,173 | B2 * | 5/2017 | Wadey | B62J 11/00 |
| 9,908,470 | B1 | 3/2018 | Englander et al. | |
| 10,681,440 | B2 * | 6/2020 | Eckert | H04R 1/026 |
| 10,766,514 | B2 * | 9/2020 | Evans | G08B 3/10 |
| 2002/0089416 | A1 | 7/2002 | Dornfeld | |
| 2005/0280526 | A1 | 12/2005 | Kalafarski | |
| 2008/0056522 | A1 | 3/2008 | Yadegari | |
| 2008/0107284 | A1 | 5/2008 | Arie et al. | |
| 2008/0169395 | A1 * | 7/2008 | Bullock | B60P 7/0815 |
| | | | | 248/304 |
| 2010/0127028 | A1 | 5/2010 | Lusk | |
| 2010/0326316 | A1 | 12/2010 | Iden | |
| 2012/0204422 | A1 | 8/2012 | Severson | |
| 2013/0079959 | A1 | 3/2013 | Swanson et al. | |
| 2015/0251668 | A1 | 9/2015 | Burg et al. | |
| 2016/0165329 | A1 | 6/2016 | Fedyay et al. | |
| 2016/0377223 | A1 * | 12/2016 | Heffel | F16B 12/38 |
| | | | | 248/215 |
| 2019/0030446 | A1 | 1/2019 | Ring | |
| 2020/0055527 | A1 | 2/2020 | Evans et al. | |
| 2020/0391777 | A1 * | 12/2020 | Evans | G08B 3/10 |

FOREIGN PATENT DOCUMENTS

| | | |
|---|---|---|
| RU | 2544778 C1 | 3/2015 |
| WO | WO-2014/028972 A1 | 2/2014 |
| WO | WO-2016127018 A1 | 8/2016 |

OTHER PUBLICATIONS

Cattron Group International, "MP96RCL Powerful Locomotive Remote Control System", <http://catalog.jamiesonequipment.com/item/all-categories/ns-mp96-rcl-locomotive-radio-> remote-control-system/mp96-rcl-locomotive-radio-remote-control-system, Jun. 23, 2015 (Jun. 23, 2015), 3 pages.

Cattron Group International, "Remote Control Solutions for Rail Applications", <http://catalog.jamiesonequipment.com/item/all-categories/ns-mp96-rcl-locomotive-radio-> remote-control-system/mp96-rcl-locomotive-radio-remote-control-system, Jun. 23, 2015 (Jun. 23, 2015), 3 pages.

Canadian Office Action for Application No. 3051793 which claims priority to the instant application; dated Feb. 25, 2021, 4 pages.

Notice of Allowance for U.S. Appl. No. 16/525,081, filed Jul. 29, 2019 which names the same inventors and assignee but is not related through a priority claim; dated Aug. 5, 2020; 6 pages.

European Search Report for EP Application No. 19191260.9 which names the same inventor and assignee but is not related by a priority claim; dated Dec. 12, 2019, 8 pages.

Train horn, Wikipedia; https://en.Wikipedia.org/wiki/Train_horn, Aug. 7, 2018, 13 pages.

MP96QC, Cattron™ for Rail, www.cattron.com, accessed Jul. 26, 2019, 2 pages.

Non-Final Office Action for U.S. Appl. No. 16/525,081, filed Jul. 29, 2019 which names the same three inventors and same assignee but is not related through a priority claim; dated Jun. 25, 2020, 12 pages.

Extended European Search Report for EP Application No. 19191281 which claims priority to the instant application; dated Jan. 22, 2020, 8 pages.

* cited by examiner

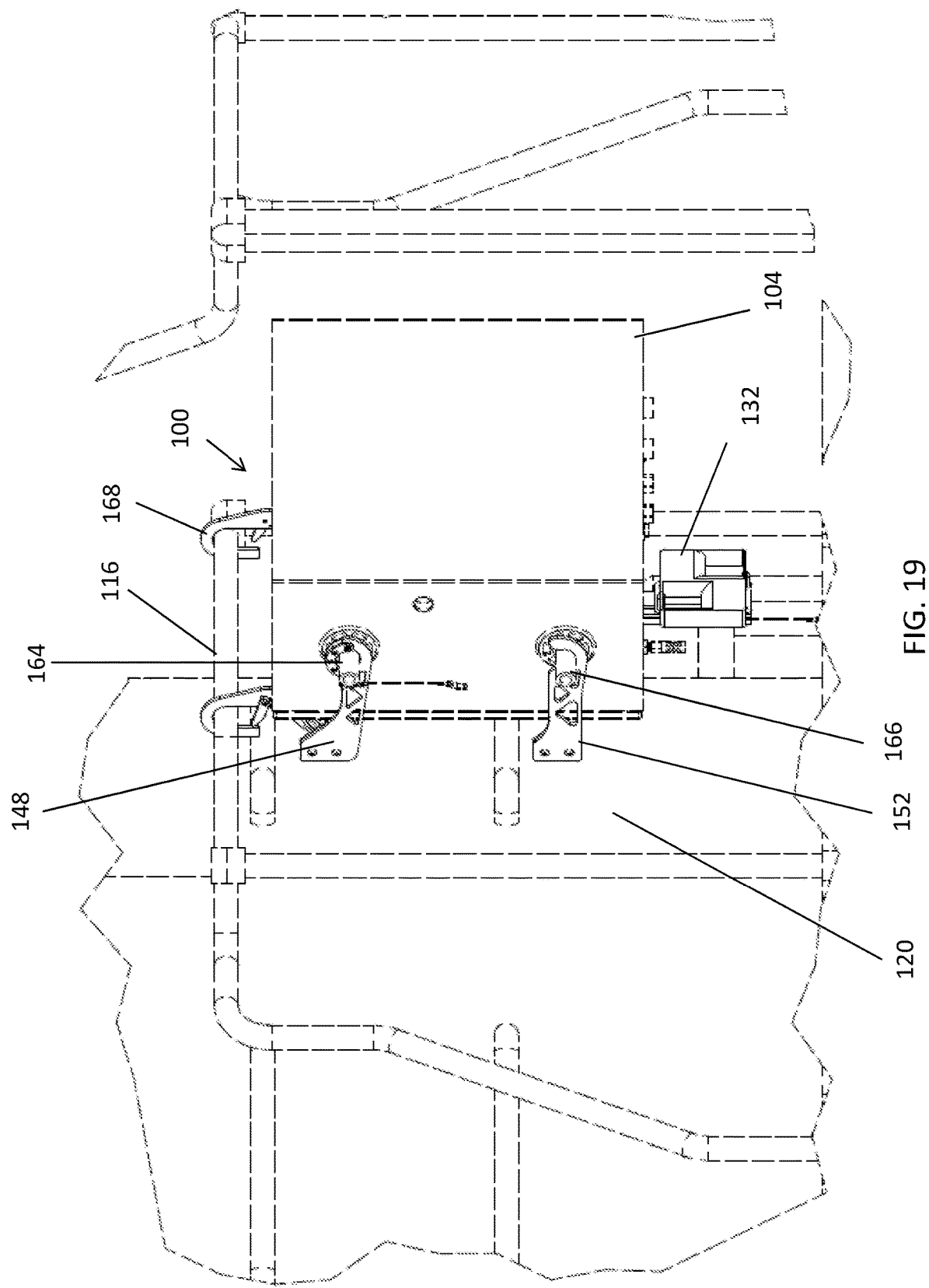

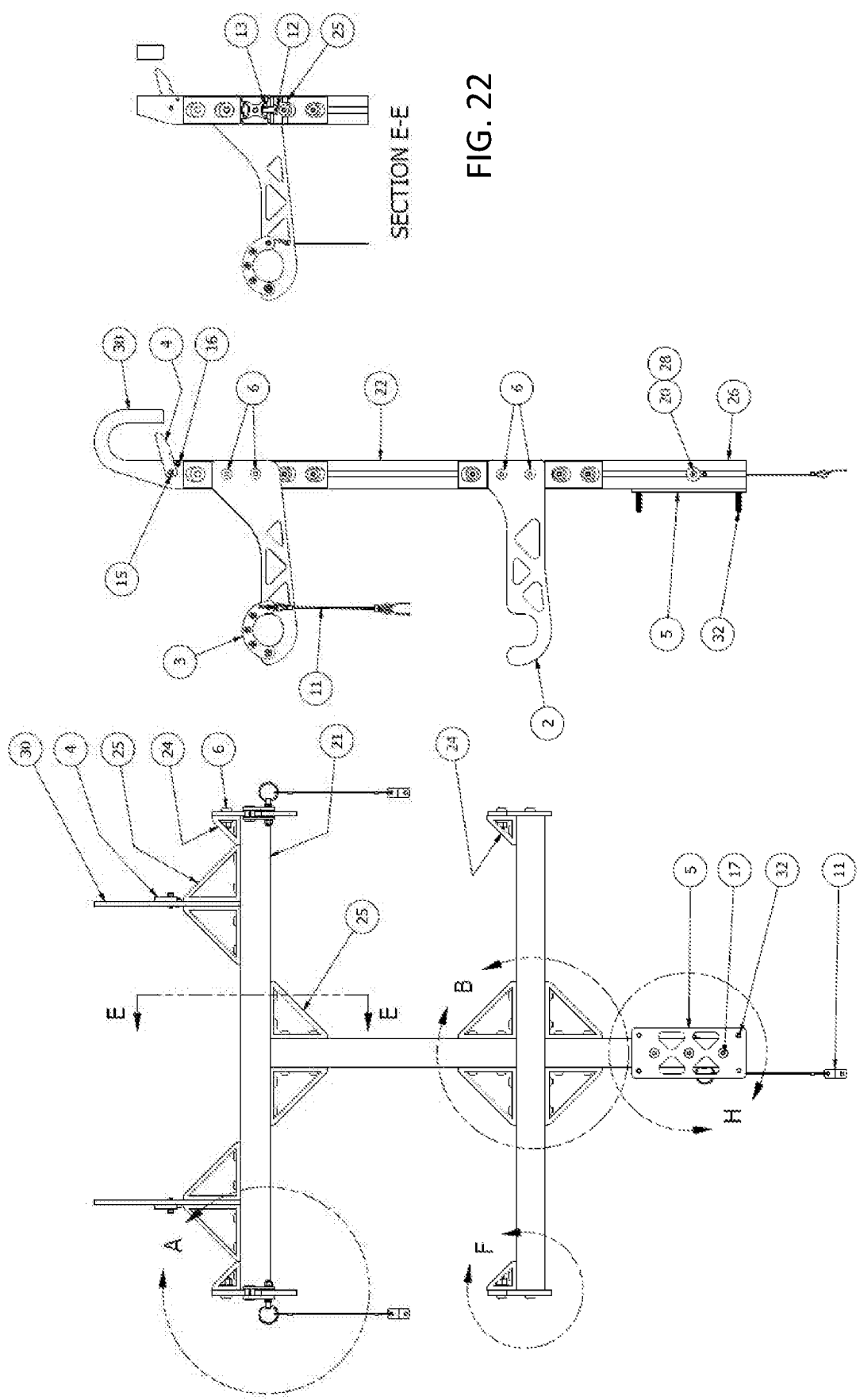

DETAIL A

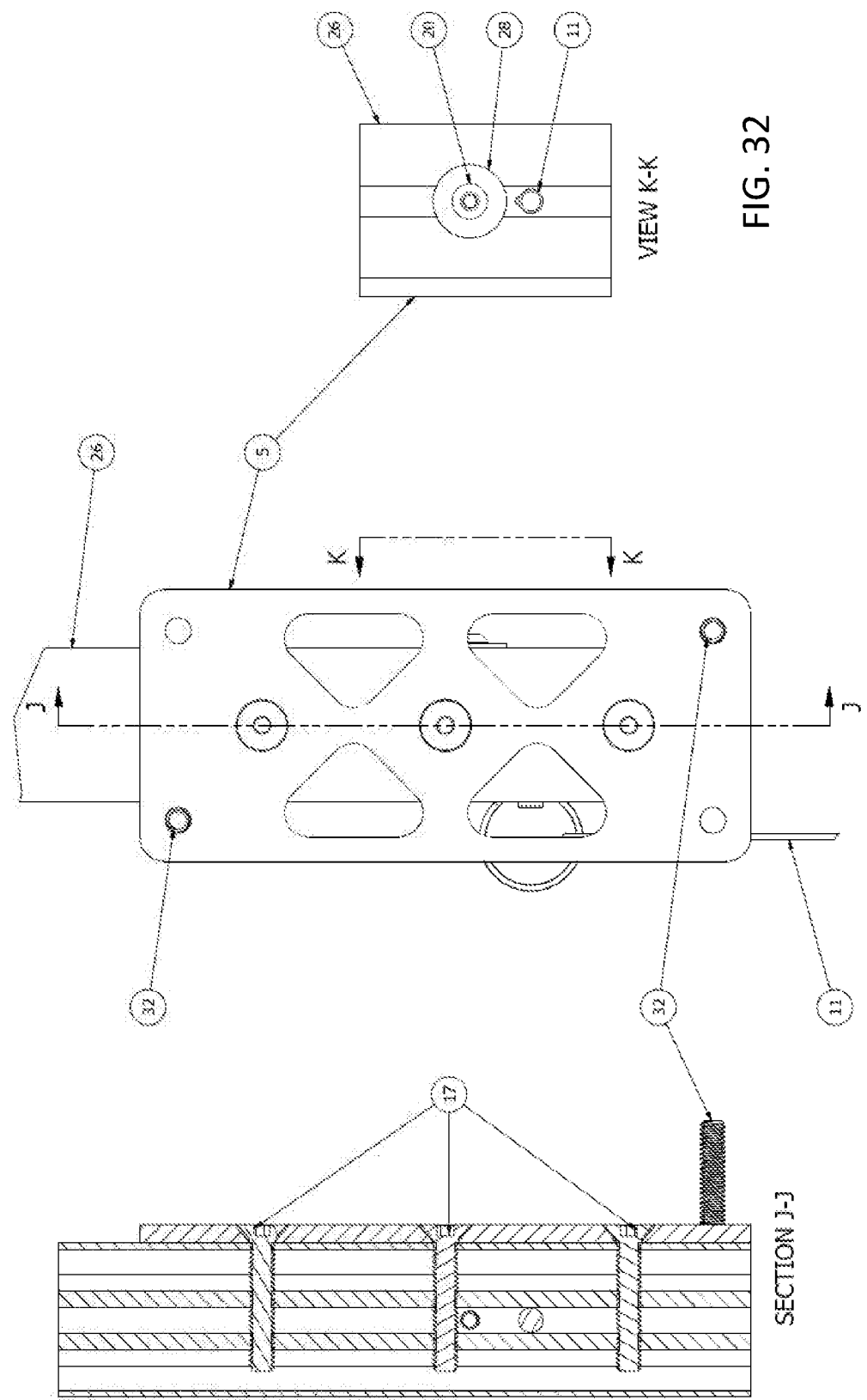

ASSEMBLIES FOR MOUNTING PORTABLE REMOTE CONTROL LOCOMOTIVE (RCL) SYSTEMS TO LOCOMOTIVE HANDRAILING

CROSS-REFERENCE TO RELATED APPLICATION

This application claims priority to and the benefit of U.S. Provisional Patent Application No. 62/718,589 filed Aug. 14, 2018. The entire disclosure of the above application is incorporated herein by reference.

FIELD

The present disclosure generally relates to assemblies for mounting portable remote control locomotive (RCL) systems to locomotive handrailing.

BACKGROUND

This section provides background information related to the present disclosure which is not necessarily prior art.

Remote control locomotive (RCL) systems enable rail operators to remotely control operation of locomotives. For example, a rail operator may use a RCL system to remotely control starting, stopping, speed, braking, switching, etc. of a locomotive.

DRAWINGS

The drawings described herein are for illustrative purposes only of selected embodiments and not all possible implementations, and are not intended to limit the scope of the present disclosure.

FIG. 17 further illustrates an exemplary enclosure of a portable RCL system that may be mounted to handrailing of a locomotive using the assembly according to an exemplary embodiment.

FIGS. 18 and 19 illustrates the assembly, the speaker, and the RCL system enclosure shown in FIG. 17, where the assembly is shown being used for mounting the speaker and the RCL system enclosure to handrailing of a locomotive according to an exemplary embodiment.

FIG. 20 is a back view of an assembly that may be used for mounting an enclosure of a portable RCL system and/or a speaker to handrailing of a locomotive according to an exemplary embodiment.

FIG. 21 is a right side view of the assembly shown in FIG. 20.

FIG. 22 is a cross-sectional view taken along the line E-E shown in FIG. 20.

FIG. 30 is a detail view of the portion of the assembly designated H in FIG. 20.

FIGS. 31 and 32 are cross-sectional views taken along the lines J-J and K-K in FIG. 30.

FIG. 33 further illustrates an exemplary speaker mounted to the assembly via an exemplary bracket.

DETAILED DESCRIPTION

Figure 1:
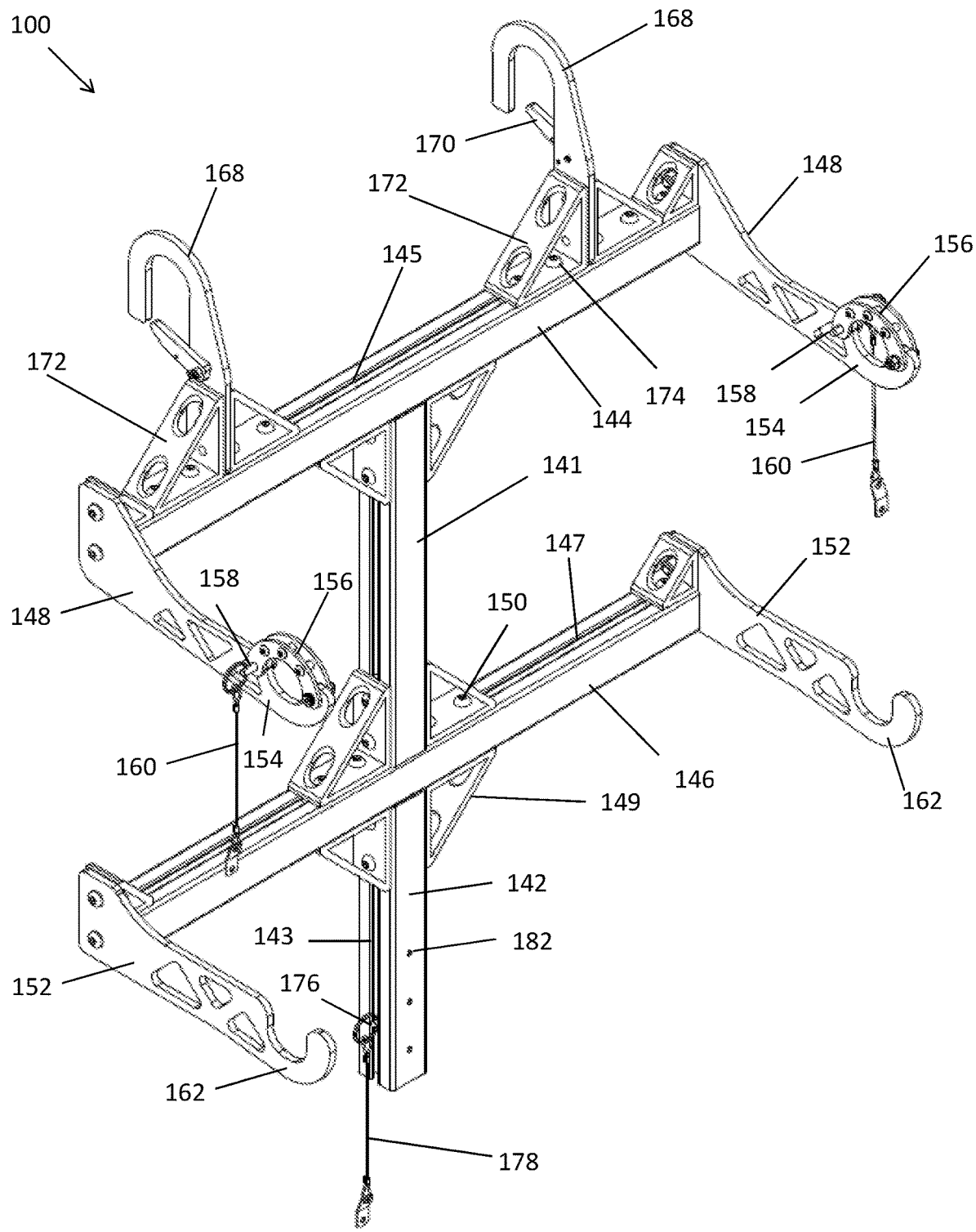
FIGS. 1 and 2 are perspective views of an assembly that may be used for mounting an enclosure of a portable remote control locomotive (RCL) system to handrailing of a locomotive according to an exemplary embodiment.

Example embodiments will now be described more fully with reference to the accompanying drawings.

Disclosed are exemplary embodiments of assemblies (e.g., a quick connect mounting cradle assembly, etc.) that may be used for mounting (e.g., without the use of any tools, etc.) enclosures of portable remote control locomotive (RCL) systems and/or speakers to locomotive handrailing. Also disclosed herein are exemplary embodiments of portable remote RCL systems mountable to locomotive handrailing by such assemblies. The portable RCL systems may enable rail operators to use handheld remote controllers to remotely control operation (e.g., movement, etc.) of locomotives from remote safe locations with a comprehensive view of each operation.

In an exemplary embodiment, a mounting assembly (broadly, an assembly) may include one or more adjustable features (e.g., slidably adjustable width top mounting hooks, etc.) that allow or accommodate for mounting to locomotive handrailing having different hand rail configurations. The mounting assembly may be configured as a quick connect mounting assembly that is mountable to locomotive handrailing without the use of any tools. After the mounting assembly is installed to the locomotive handrailing, an enclosure (e.g., of a portable RCL system, etc.) may then be lifted and installed to the assembly without the use of any tools. In this exemplary embodiment, a pair of upper and lower members (e.g., rods, cylindrical members, supports, etc.) may extend outwardly from each of the two opposing sides of the enclosure. The enclosure's upper members and lower members may be configured (e.g., sized, shaped, located, etc.) to be engagingly received, respectively, within portions (e.g., hook shaped portions, etc.) of the upper arms (e.g., pin locking arms, etc.) and lower arms (e.g., lower hooks, etc.) of the mounting assembly. The upper arms of the mounting assembly may comprise two pin locking arms for securing the enclosure to the assembly.

This exemplary embodiment may generally include two main pieces of hardware, which are the mounting assembly and the enclosure. The mounting assembly and enclosure are configured to allow the enclosure to quick mount to the mounting assembly without the use of any tools. Advantageously, this allows the overall weight to be distributed between these two pieces of hardware, which, in turn, allows for a faster safer installation. For example, the lighter mounting assembly may first be installed to the handrailing of the locomotive without using any tools. The heavier enclosure, including the RCL system components therein (e.g., FIG. 38, etc.), may then be lifted without the additional weight of the previously installed mounting assembly. The enclosure may then be placed on and installed to the mounting assembly without the use of any tools. This exemplary embodiment may thus allow for a fast, safe, easy, and tool-less installation of a portable RCL system to handrailing of a locomotive, while also providing adjustability to account for a wide variety of locomotive handrails and obstructions near the site at which the mounting assembly will be installed.

Also disclosed are exemplary embodiments of audible alert systems. In exemplary embodiments, an audible alert system includes an outdoor speaker, an audio amplifier, and an audio file player. The audio amplifier and audio file player may be housed within an environmentally sealed enclosure, which provides protection from the environment.

The speaker may be located on the front or back of a locomotive. The speaker may be mounted or installed on a locomotive in various ways. For example, the speaker may be fixedly mounted (e.g., bolted, mechanically fastened, etc.) to handrailing of a locomotive by using mechanical fasteners, etc. Or, for example, the speaker may be mounted to handrailing of a locomotive by using a quick connect mounting assembly disclosed herein. The quick connect mounting assembly may be configured to be mounted to the locomotive handrailing without the use of any tools.

The audible alert system may be DC (direct current) powered and energy efficient. The speaker may comprise a 100 Watts, 12 volts direct current (VDC) speaker having a relatively thin or slim profile. Alternatively, the audible alert system may include a speaker having a different configuration (e.g., higher or lower than 100 Watts, higher or lower than 12 VDC, etc.) in alternative exemplary embodiments.

Advantageously, the speaker may be lower in weight than and may replace the traditional pneumatic air horn and pneumatic bell currently used on locomotives. The audible alert system, including the speaker, may provide the ability to program multiple sounds and modernize a pneumatic air horn while maintaining overall sound quality. The audio alert system may allow for reduced cost, complexity, and labor to include safety sounding devices onboard locomotives. The audio alert system may also provide integrated audio (voice and tones) and future capabilities to broadcast voice messages.

Figure 17:
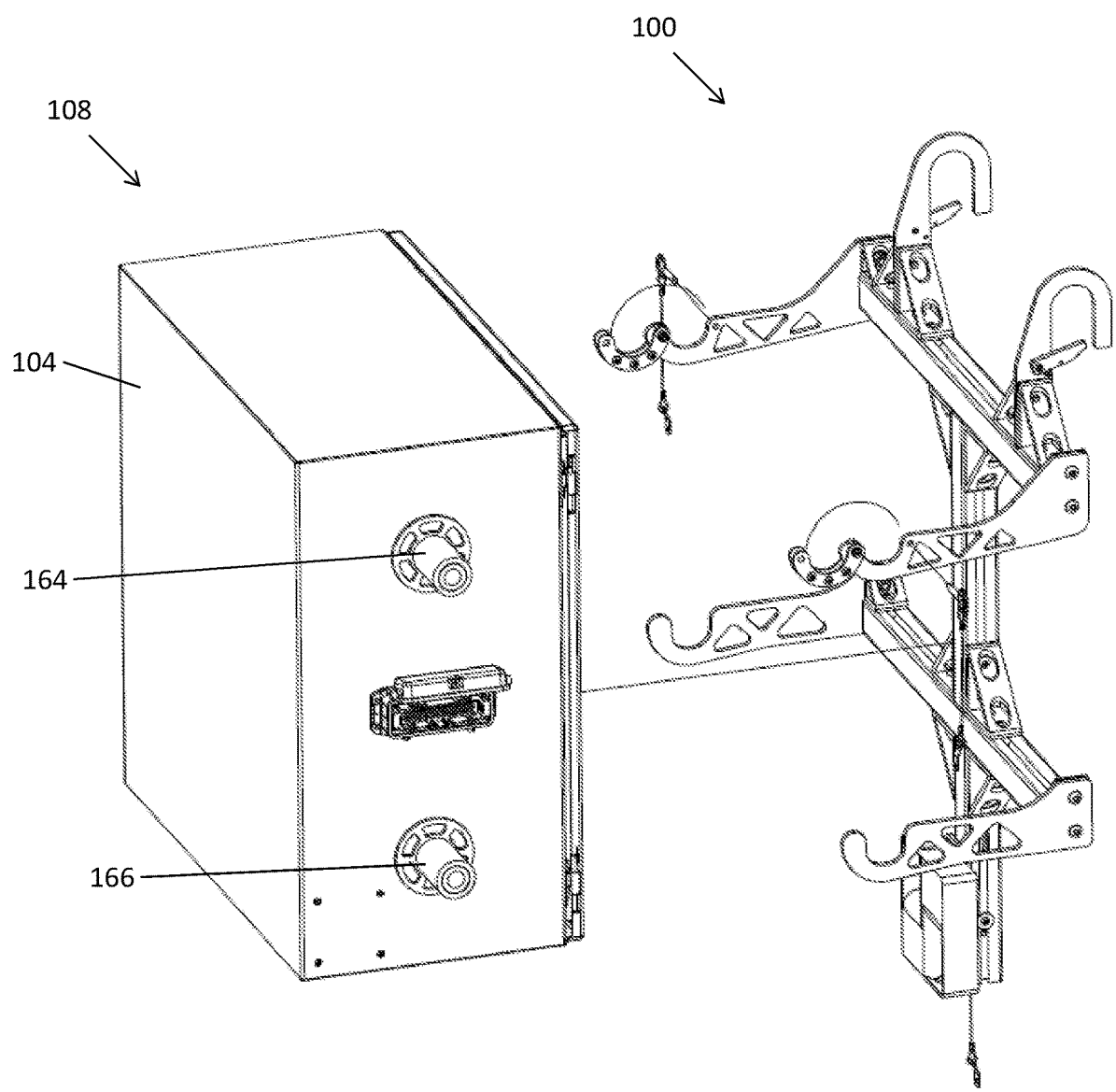
FIG. 17 is a perspective view showing the assembly and the speaker shown in 9.
Figure 18:
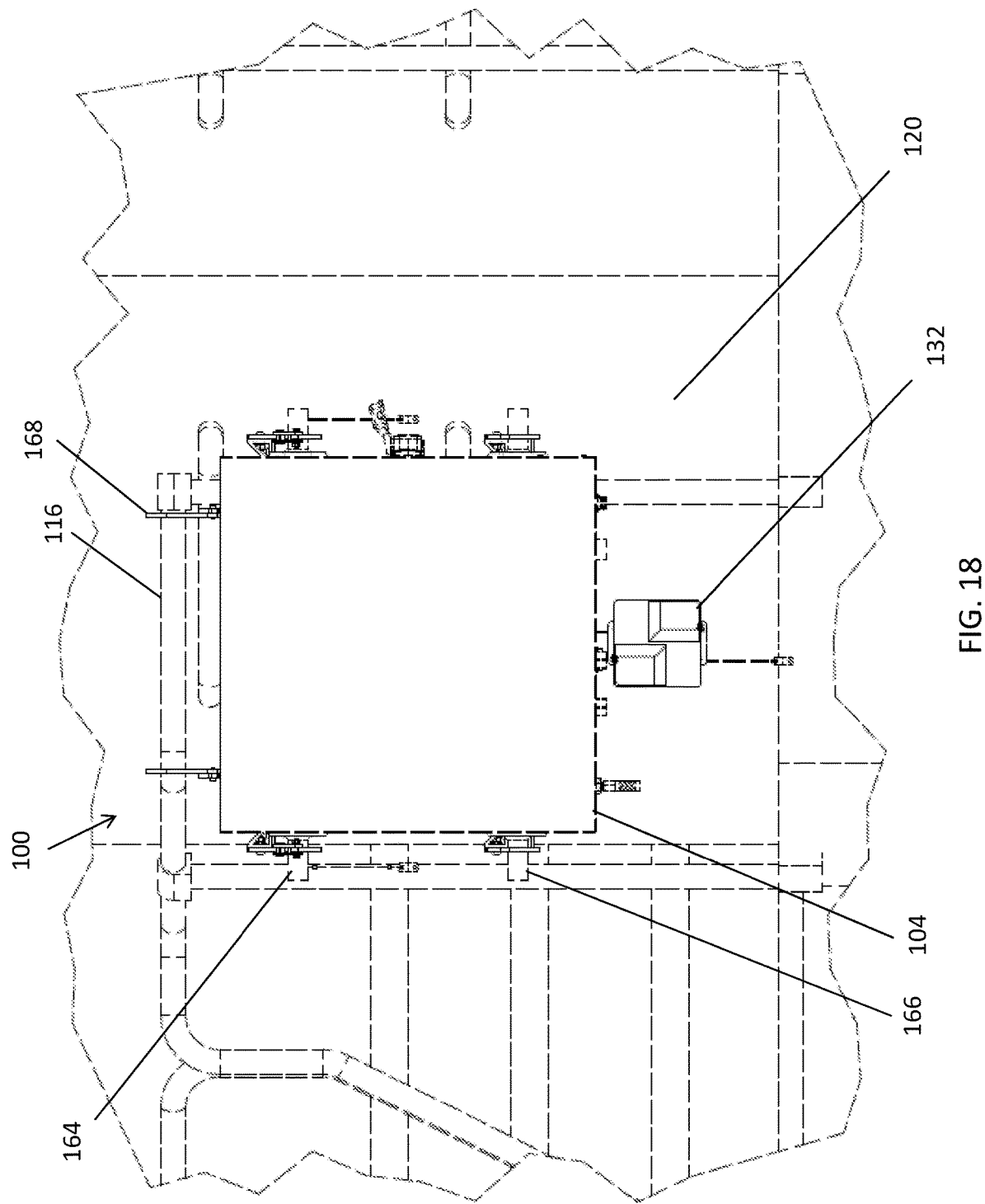
Figure 24:
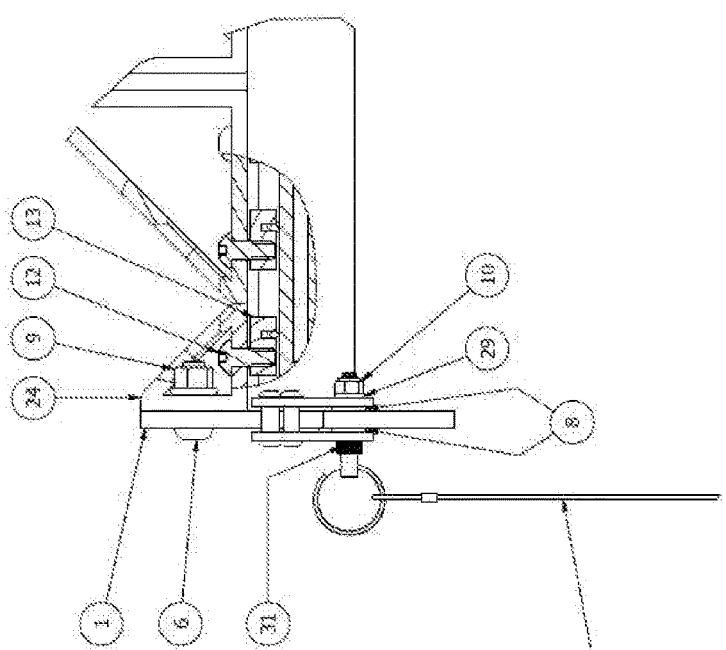
FIGS. 23 and 24 are detail views of the portion of the assembly designated A in FIG. 20.
Figure 23:
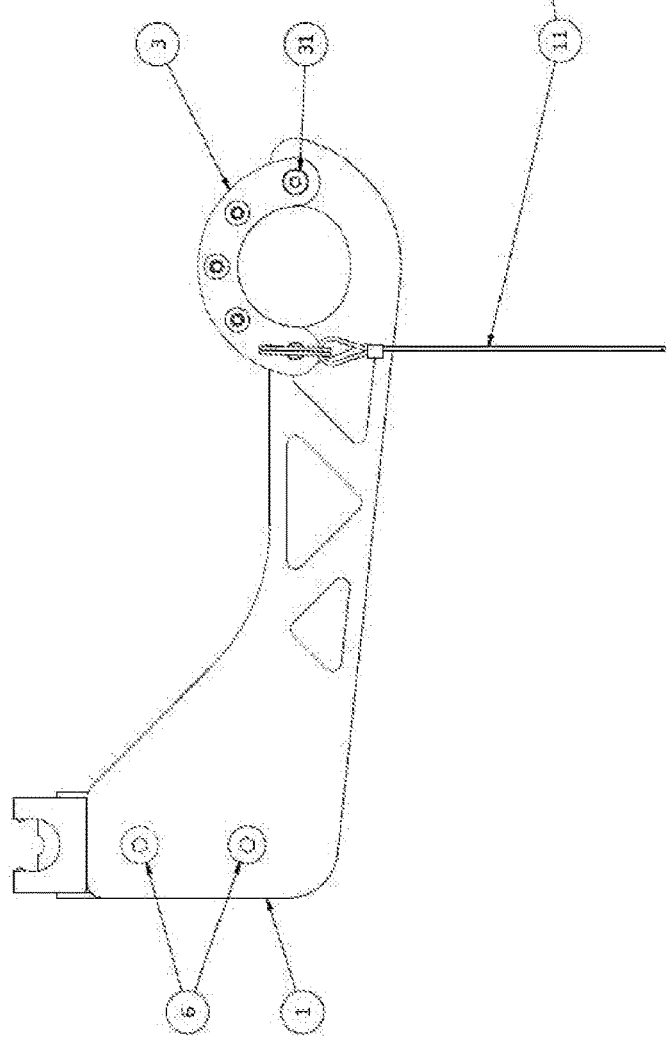
Figure 27:
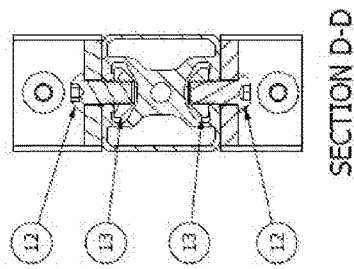
FIGS. 26 and 27 are cross-sectional views taken along the lines C-C and D-D in FIG. 25.
Figure 25:
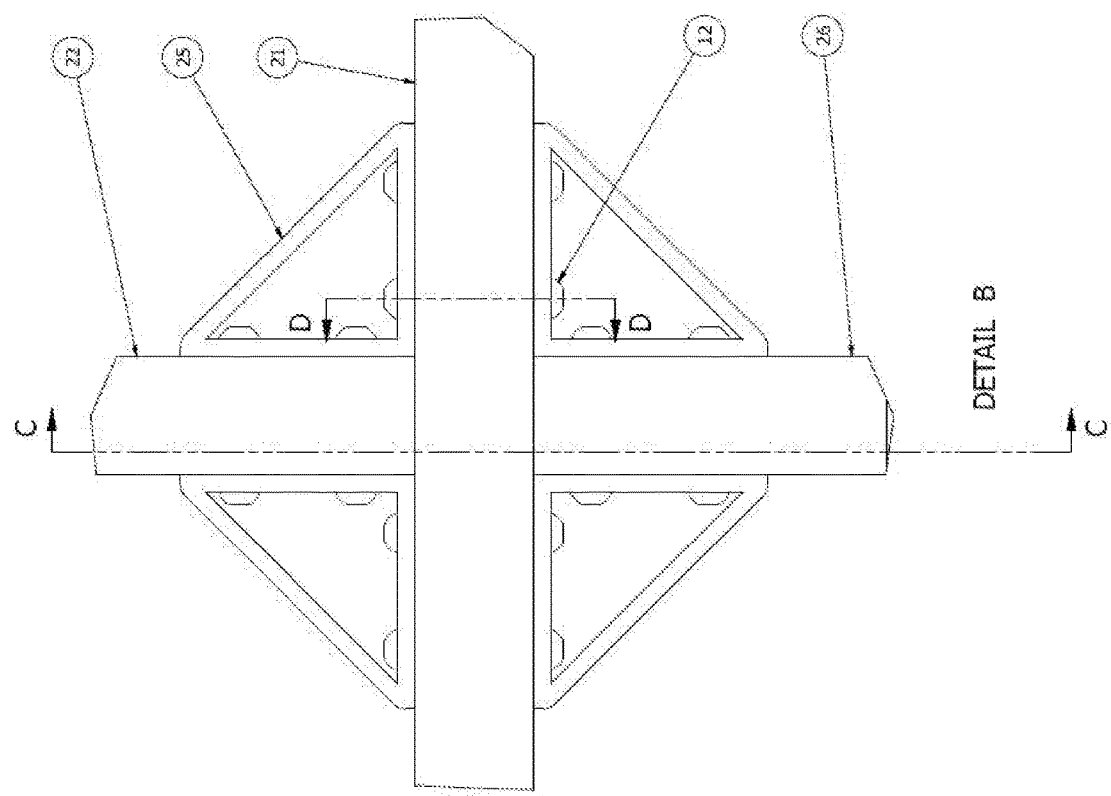
FIG. 25 is a detail view of the portion of the assembly designated B in FIG. 20.
Figure 26:
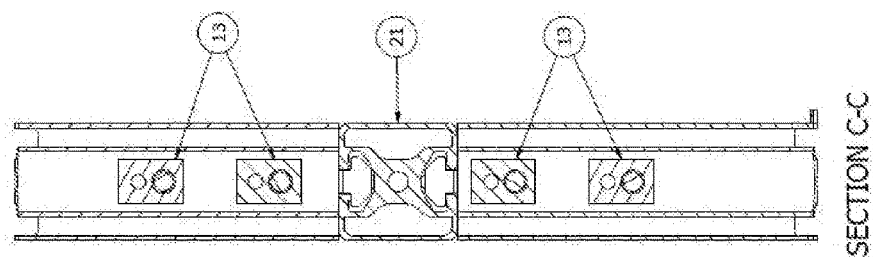
Figure 28:
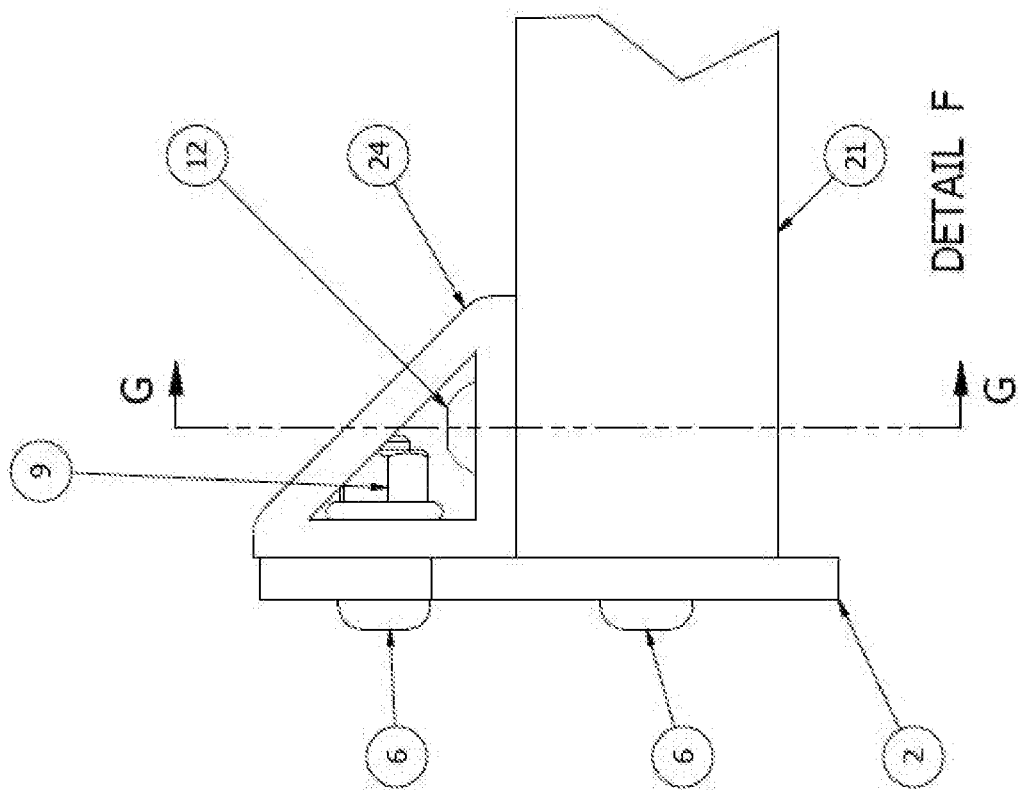
FIG. 28 is a detail view of the portion of the assembly designated F in FIG. 20.
Figure 29:
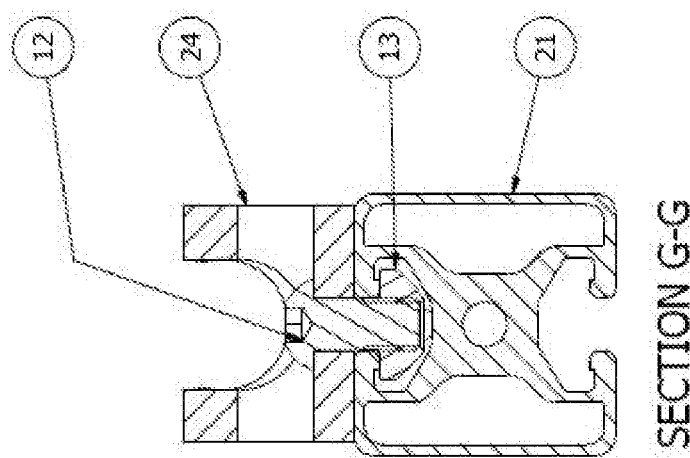
FIG. 29 is a cross-sectional view taken along the lines G-G in FIG. 28.
Figure 36:
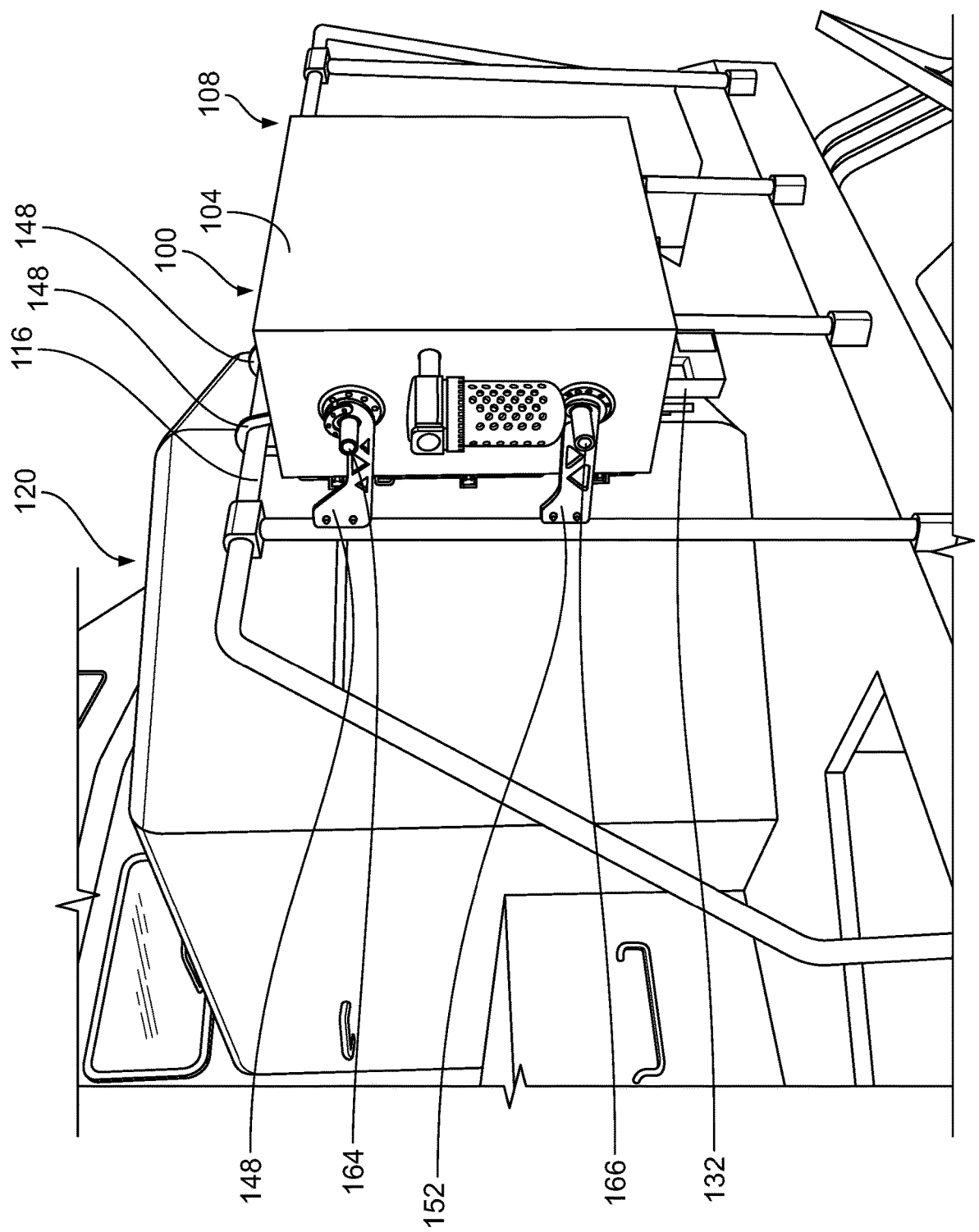
FIG. 36 illustrates the assembly shown in FIG. 33 and the portable RCL system shown in FIGS. 34 and 35 mounted to handrailing of a locomotive.
Figure 37:
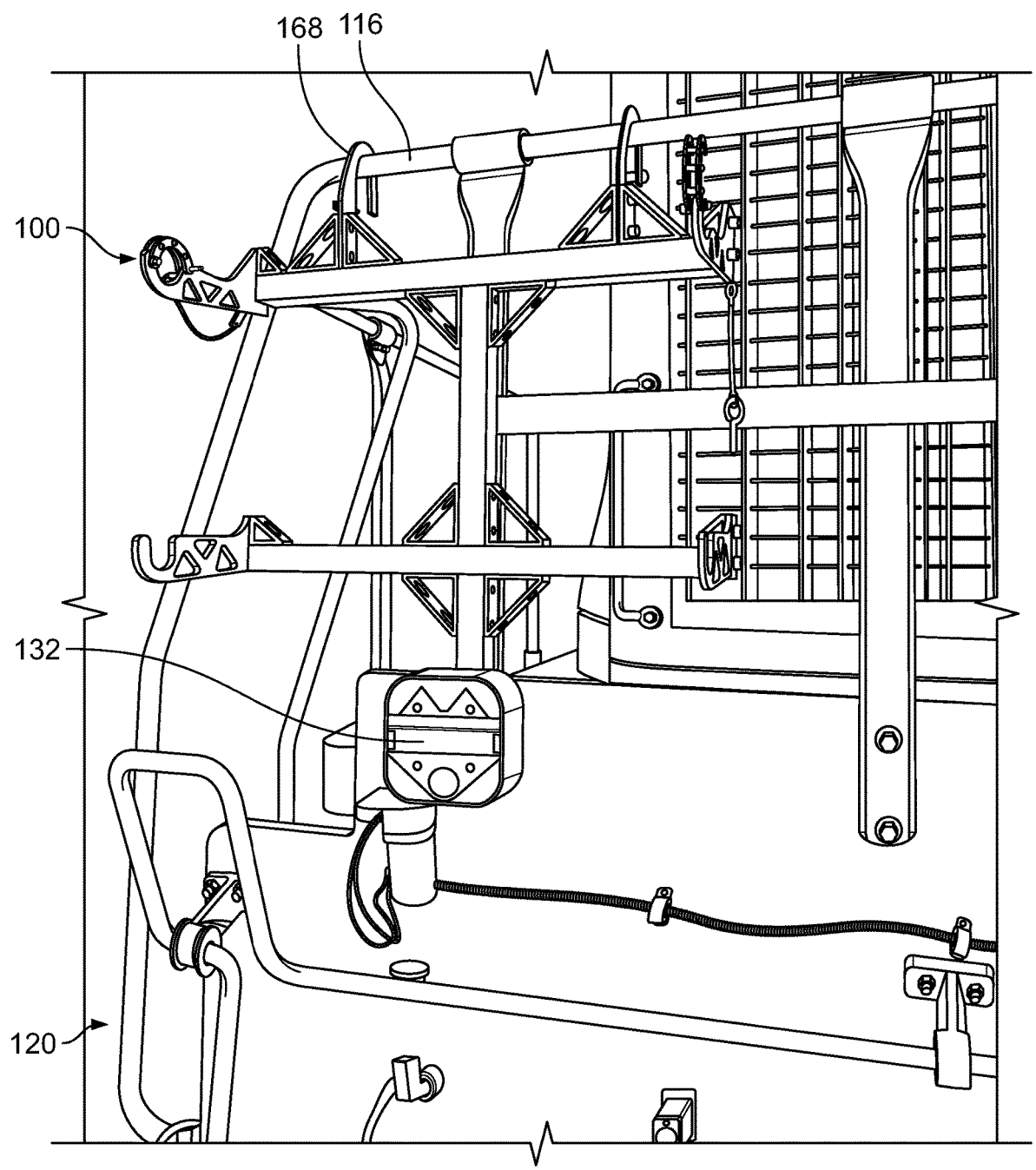
FIG. 37 illustrates the assembly and speaker shown in FIG. 33 mounted to handrailing of a locomotive.

With reference now to the figures, FIGS. 1 through 8 illustrate an exemplary embodiment of a quick connect mounting cradle assembly 100 (broadly, an assembly) embodying one or more aspects of the present disclosure. As shown in FIGS. 17, 18, and 36, the assembly 100 may be used for mounting an enclosure 104 of a portable remote control locomotive (RCL) system 108 (FIG. 38) to handrailing 116 of a locomotive 120. The assembly 100 may also, or instead (FIG. 37), be used for mounting a speaker 132 to the locomotive handrailing 116. The portable RCL system 108 and speaker 132 are examples only as the assembly 100 may also be used with other portable RCL systems and/or speakers in alternative exemplary embodiments.

Figure 2:
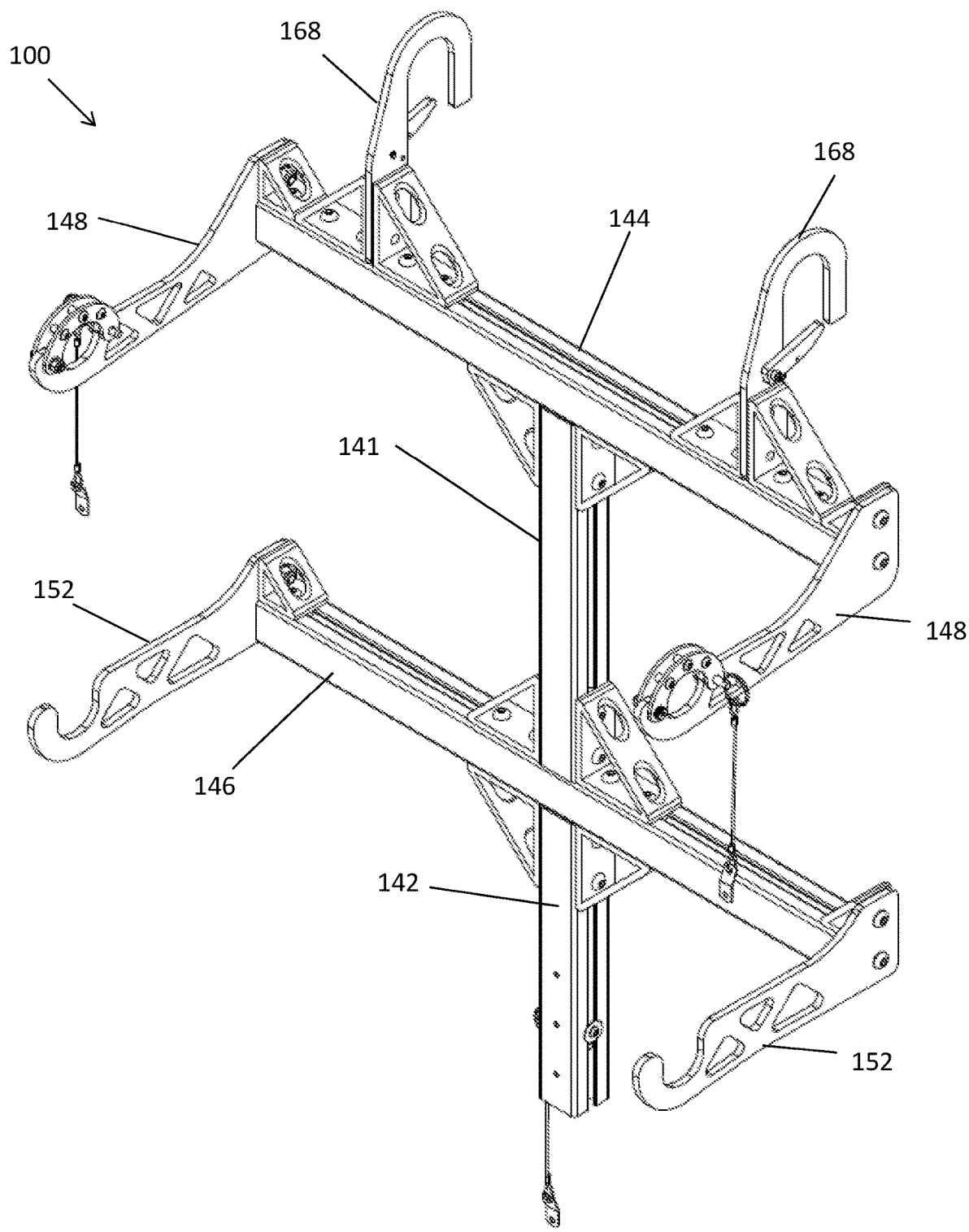
Figure 3:
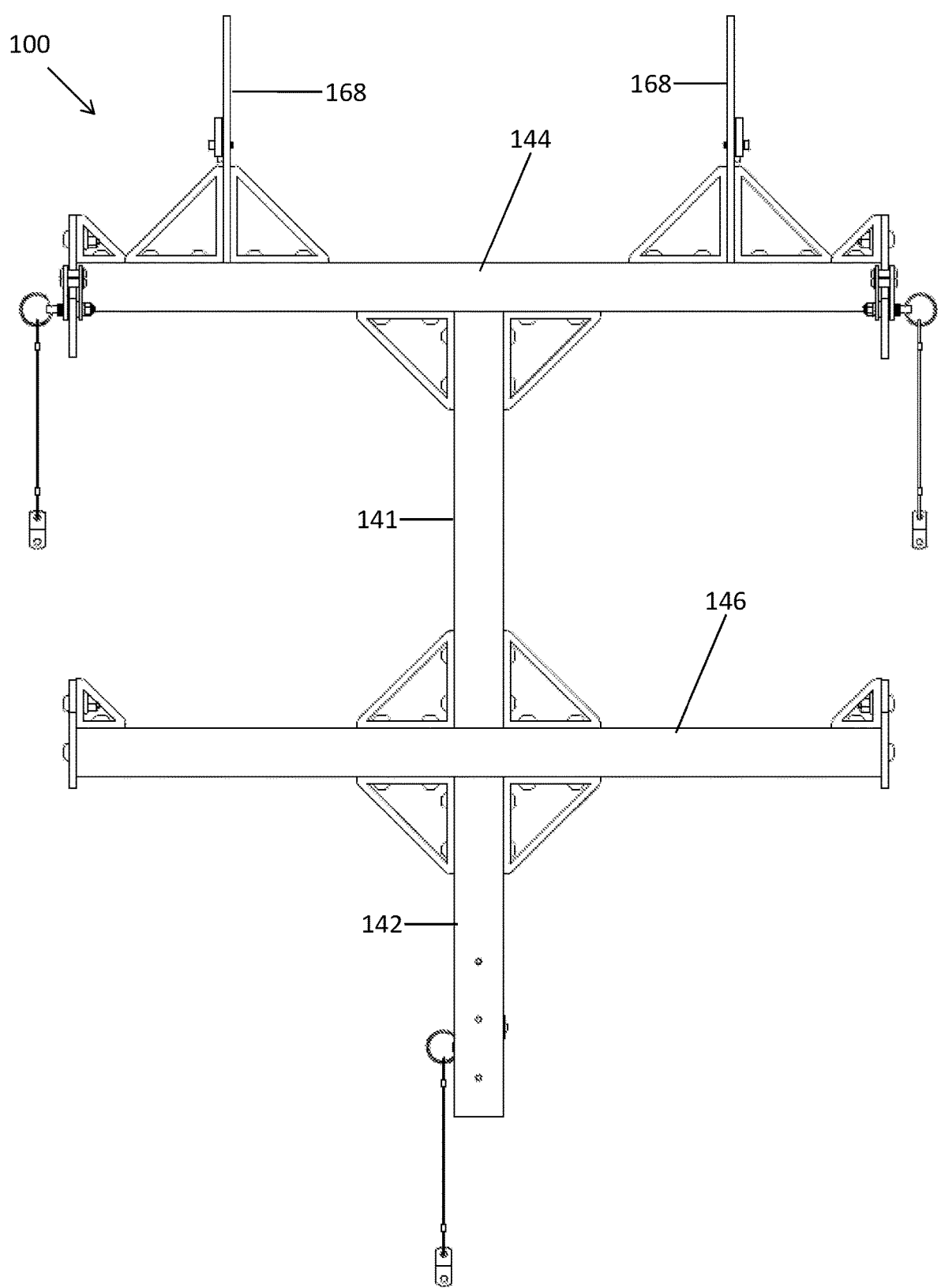
FIGS. 3 and 4 are front and back views, respectively, of the assembly shown in FIG. 1.
Figure 4:
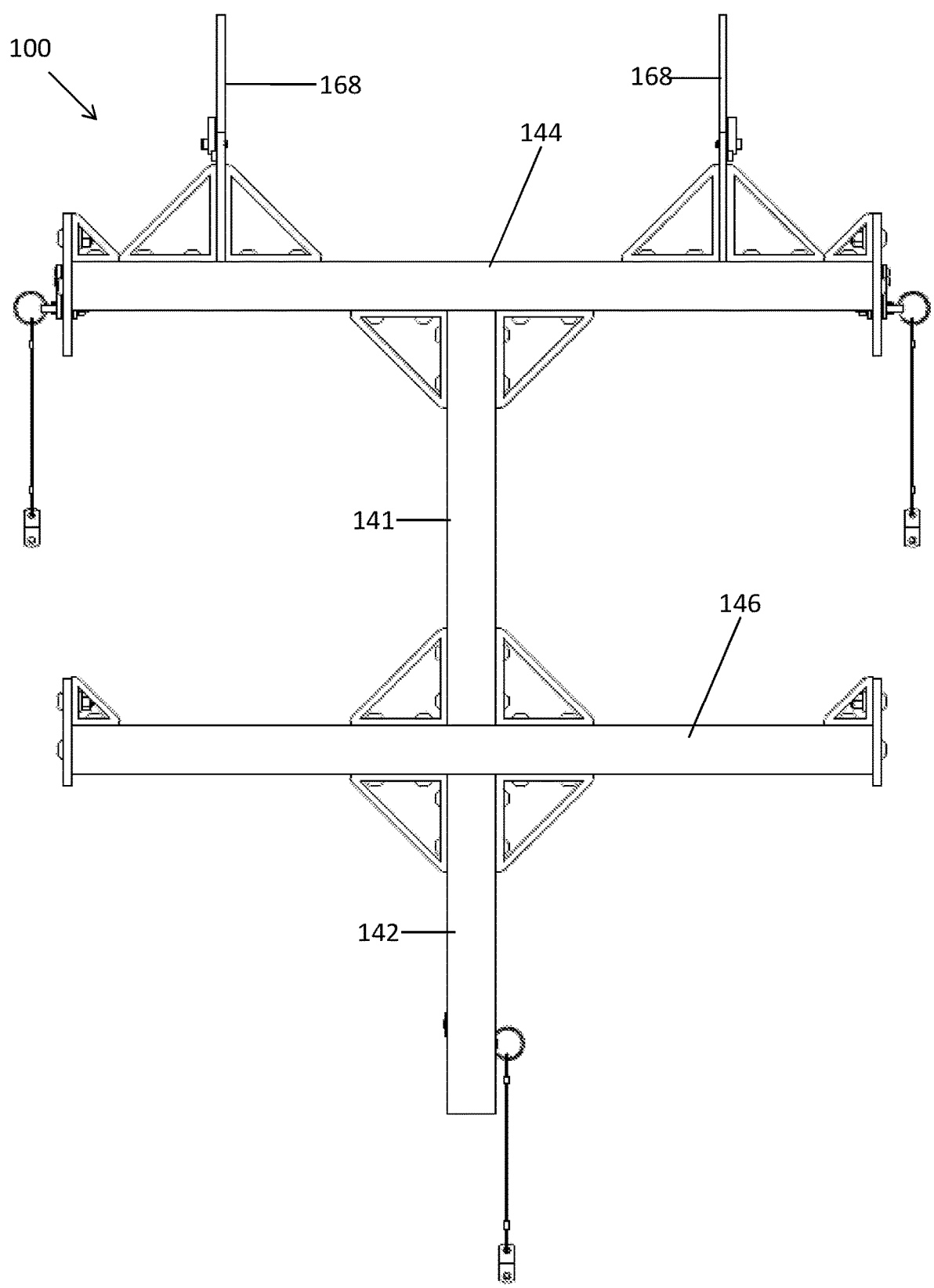
Figure 5:
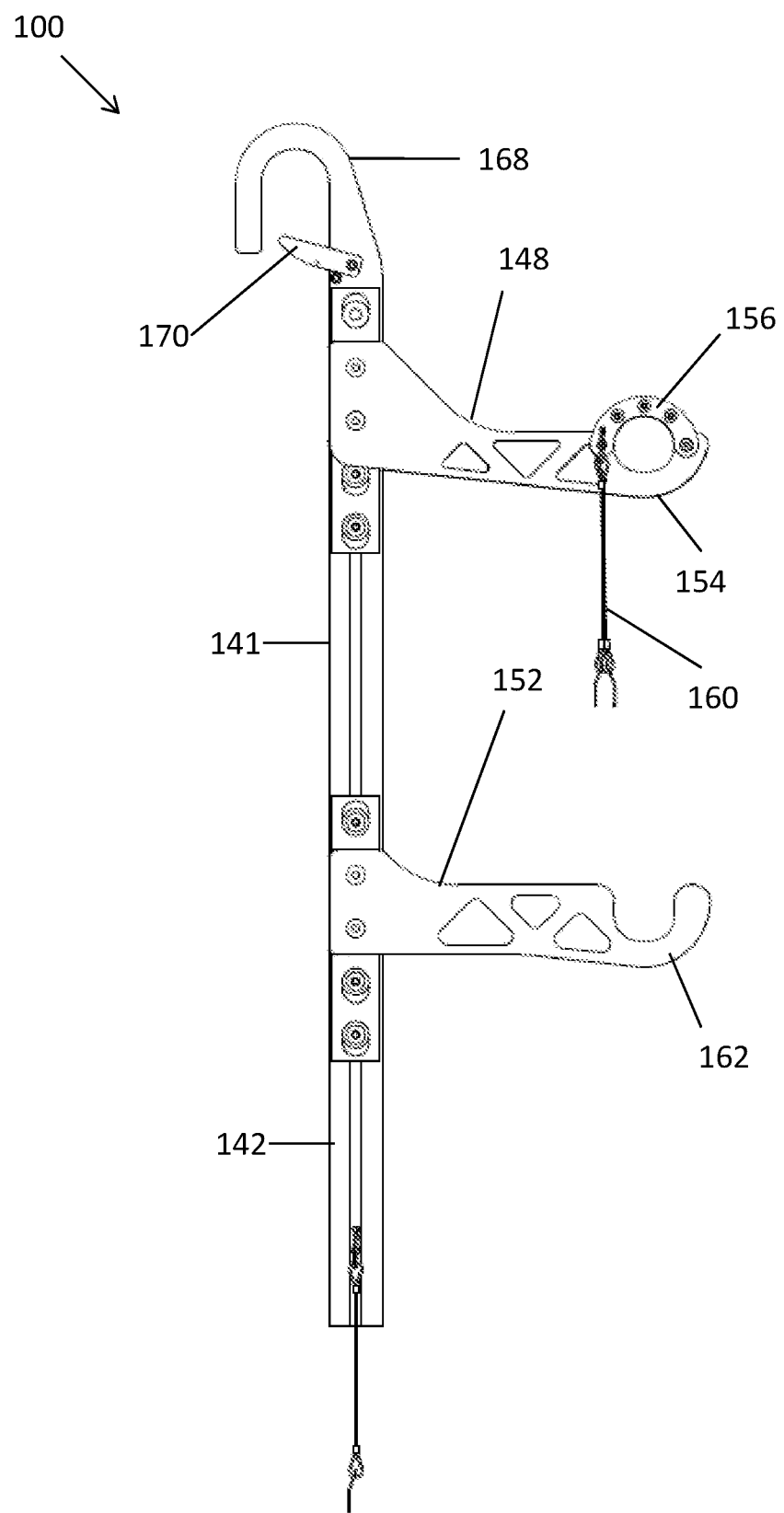
FIGS. 5 and 6 are left and right side views, respectively, of the assembly shown in FIG. 1.
Figure 6:
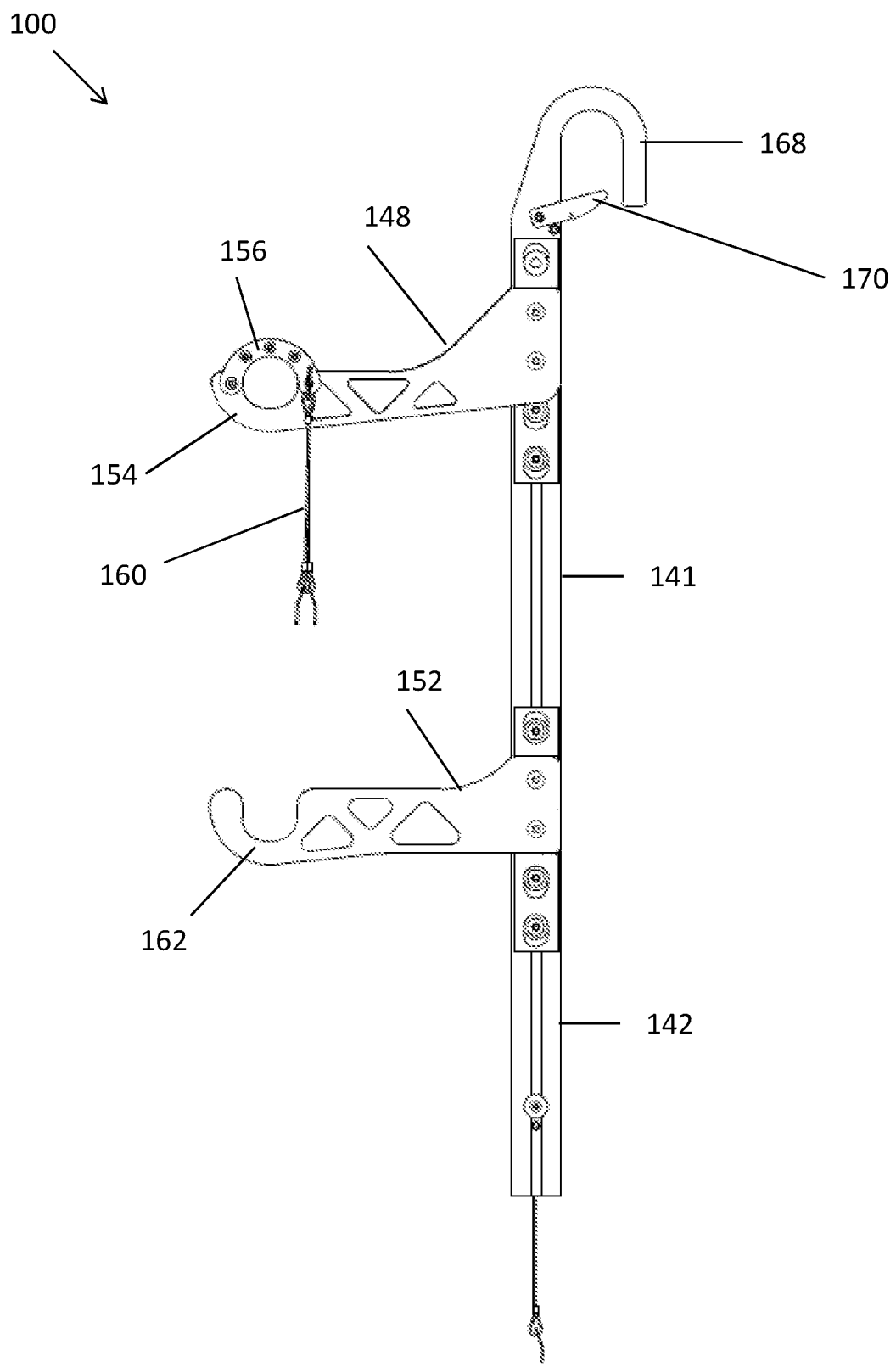
Figure 7:
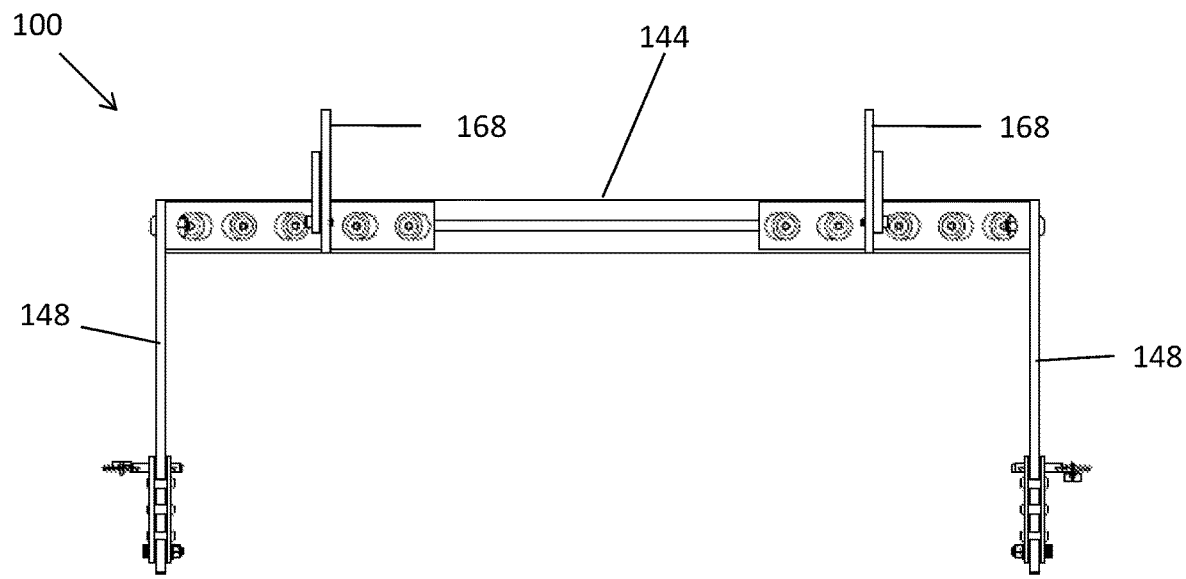
FIGS. 7 and 8 are top and bottom views, respectively, of the assembly shown in FIG. 1.
Figure 8:
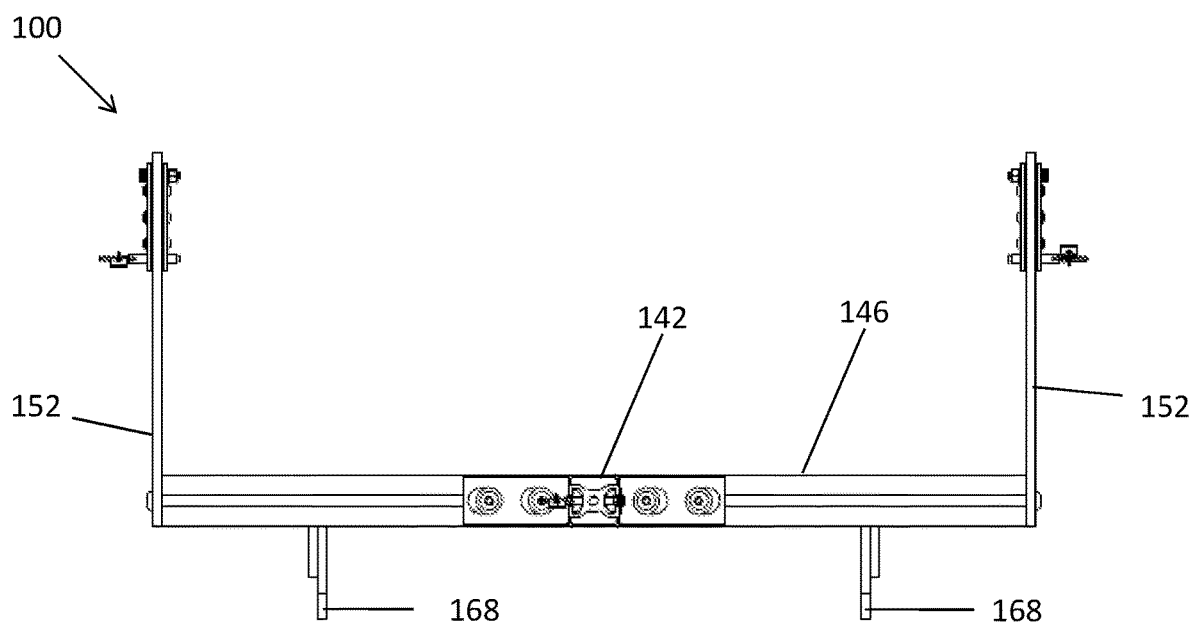
Figure 9:
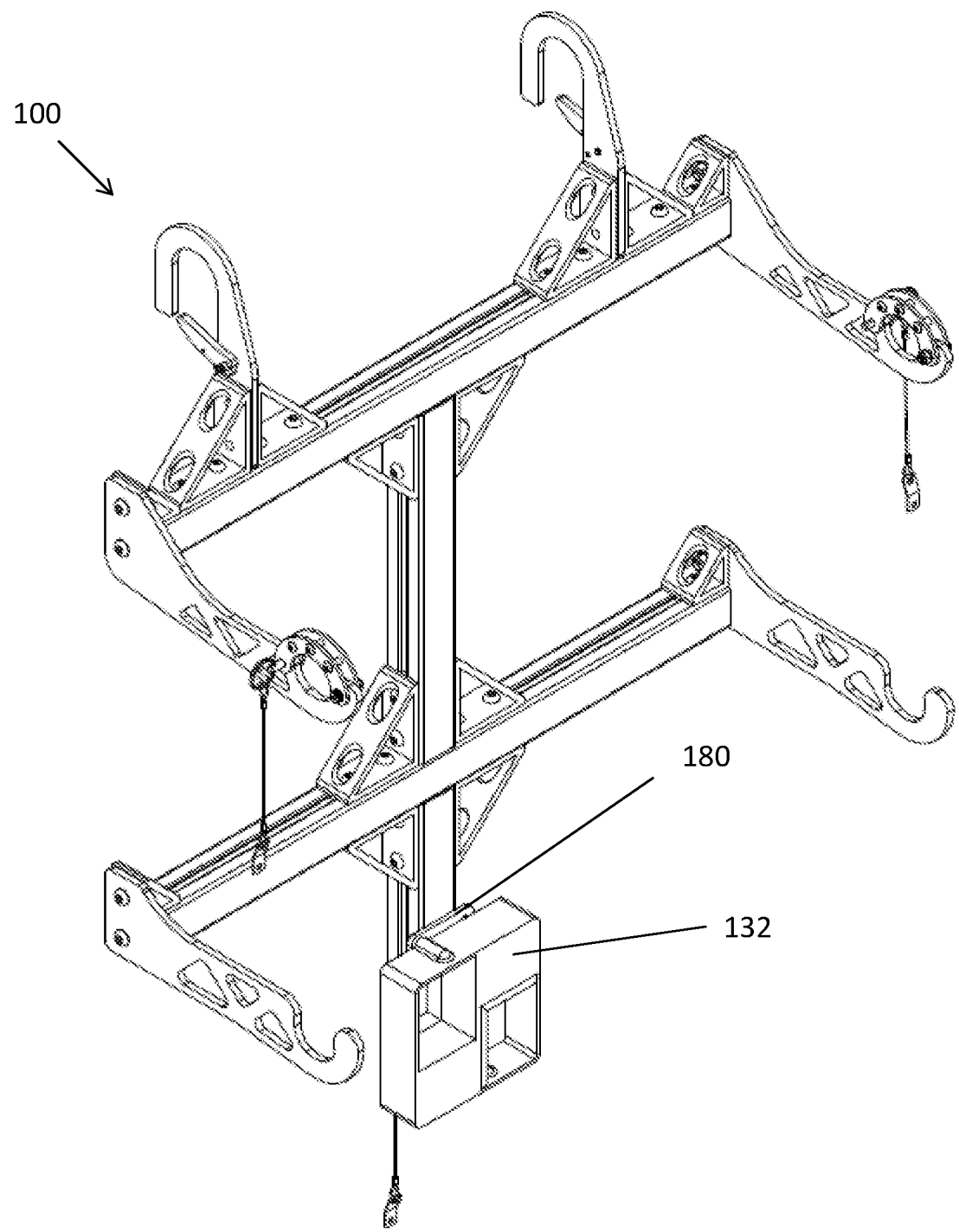
FIGS. 9 and 10 are perspective views of the assembly shown in FIG. 1, and further illustrating an exemplary speaker mounted to the assembly via an exemplary bracket according to an exemplary embodiment.
Figure 10:
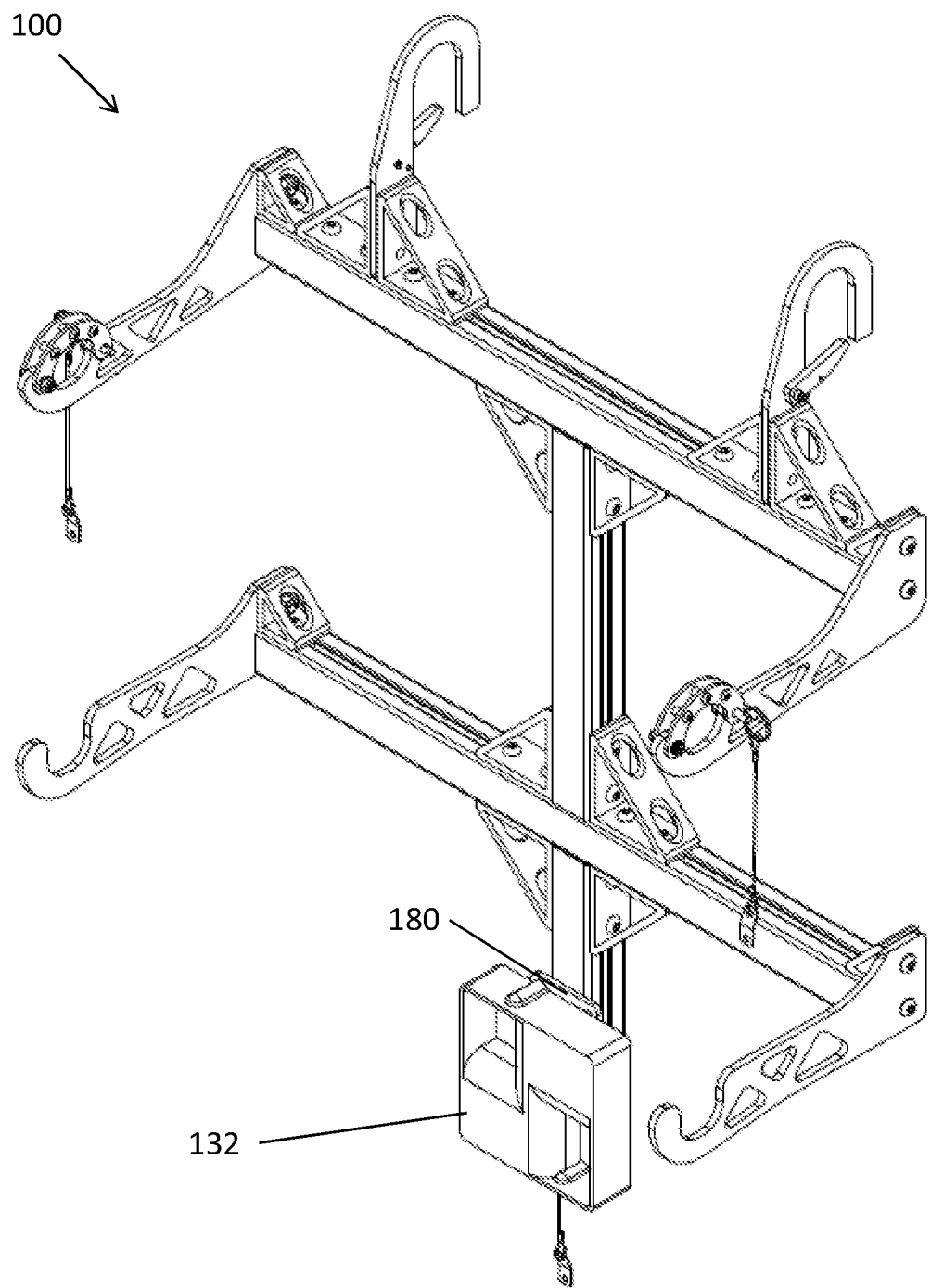
Figure 11:
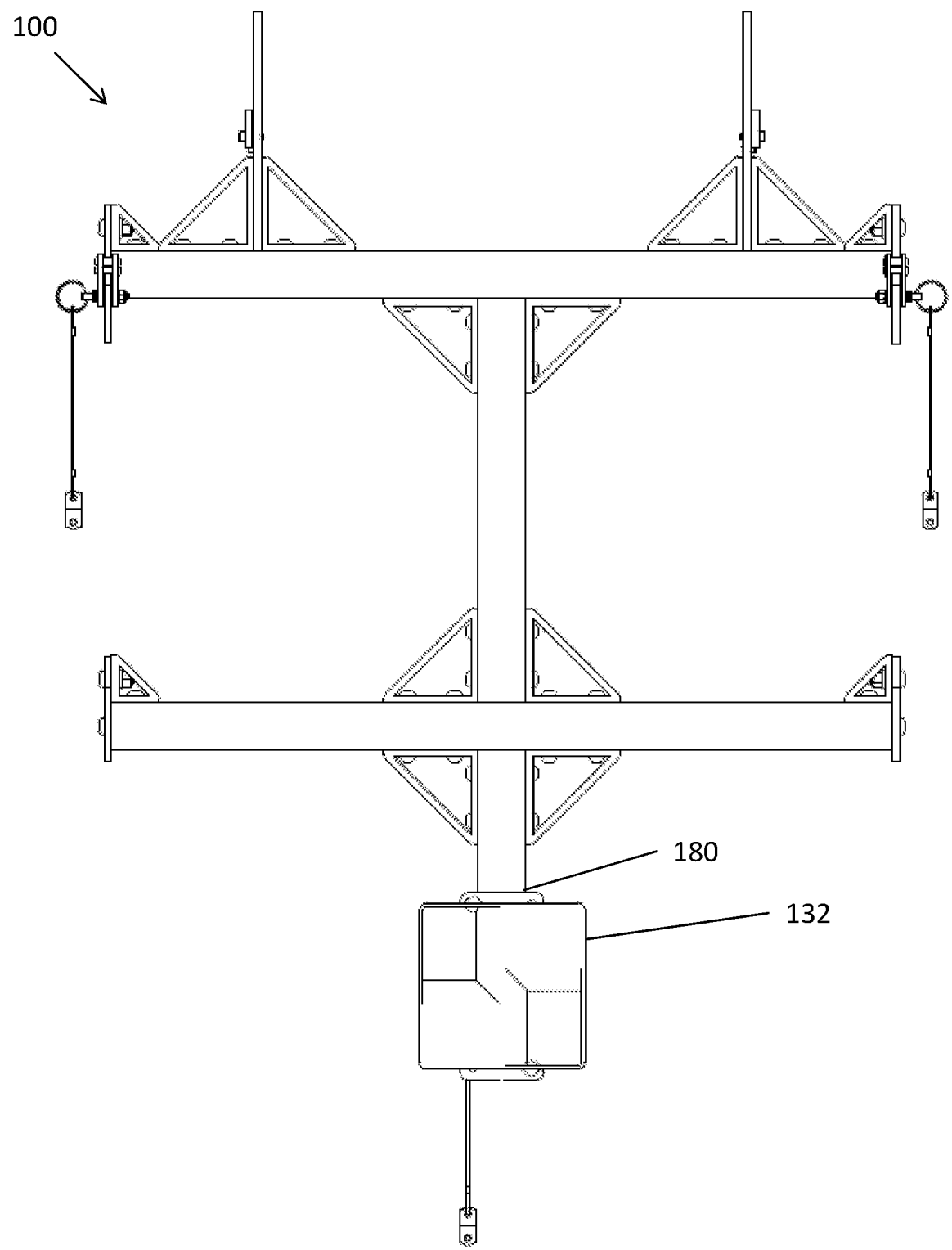
FIGS. 11 and 12 are front and back views, respectively, of the assembly, speaker, and bracket shown in FIG. 9.
Figure 12:
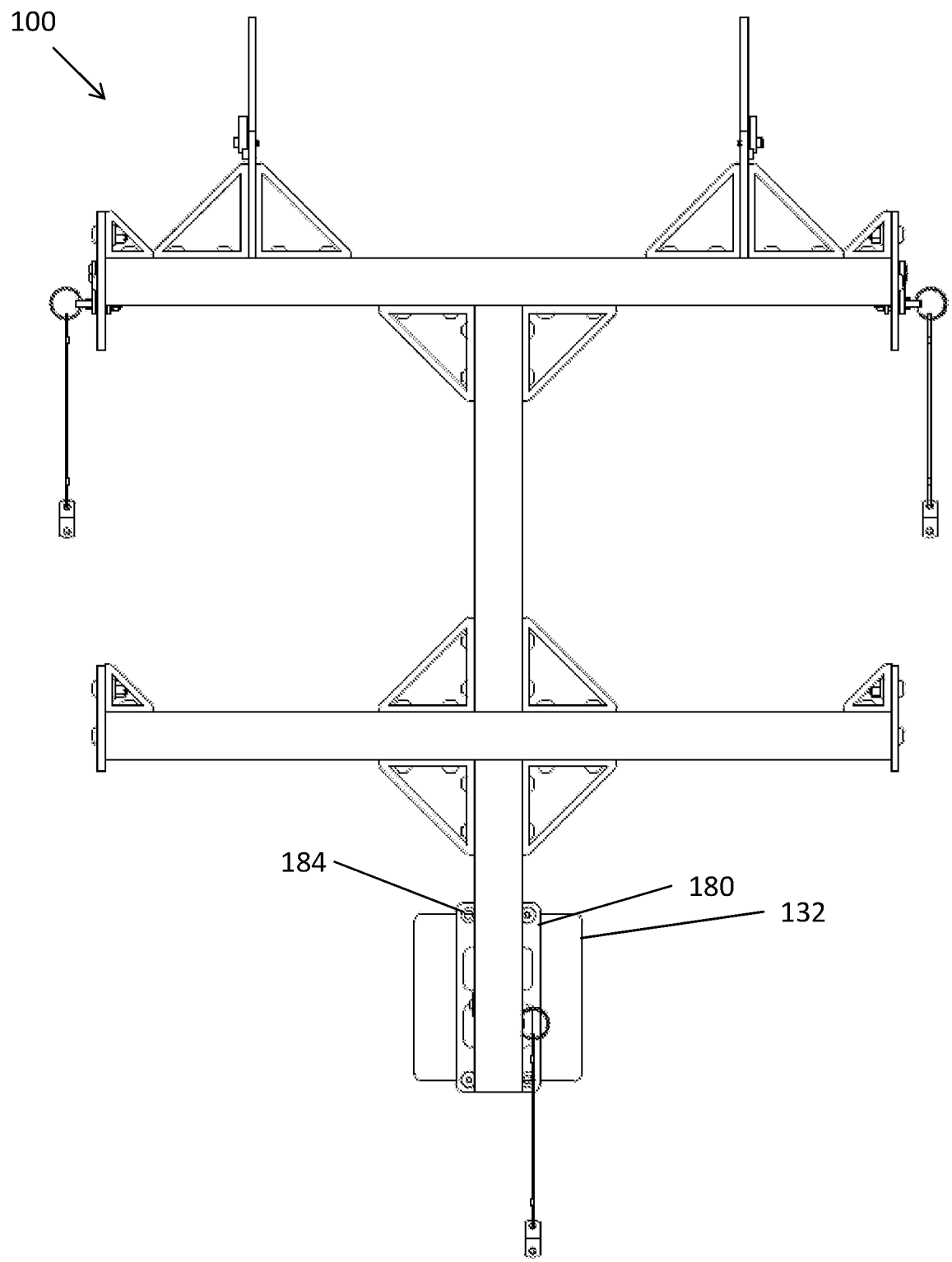
Figure 13:
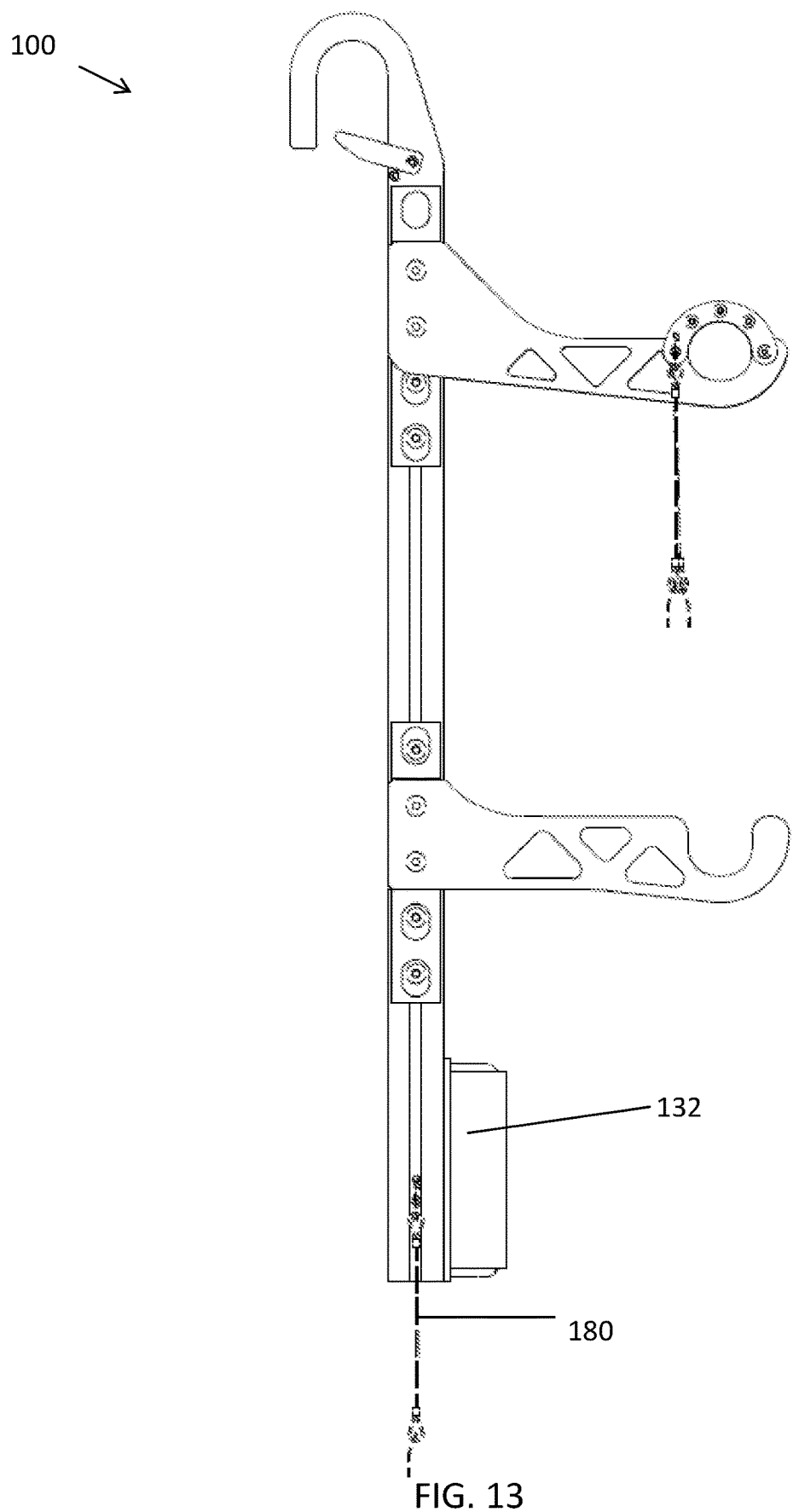
FIGS. 13 and 14 are left and right side views, respectively, of the assembly, speaker, and bracket shown in FIG. 9.
Figure 14:
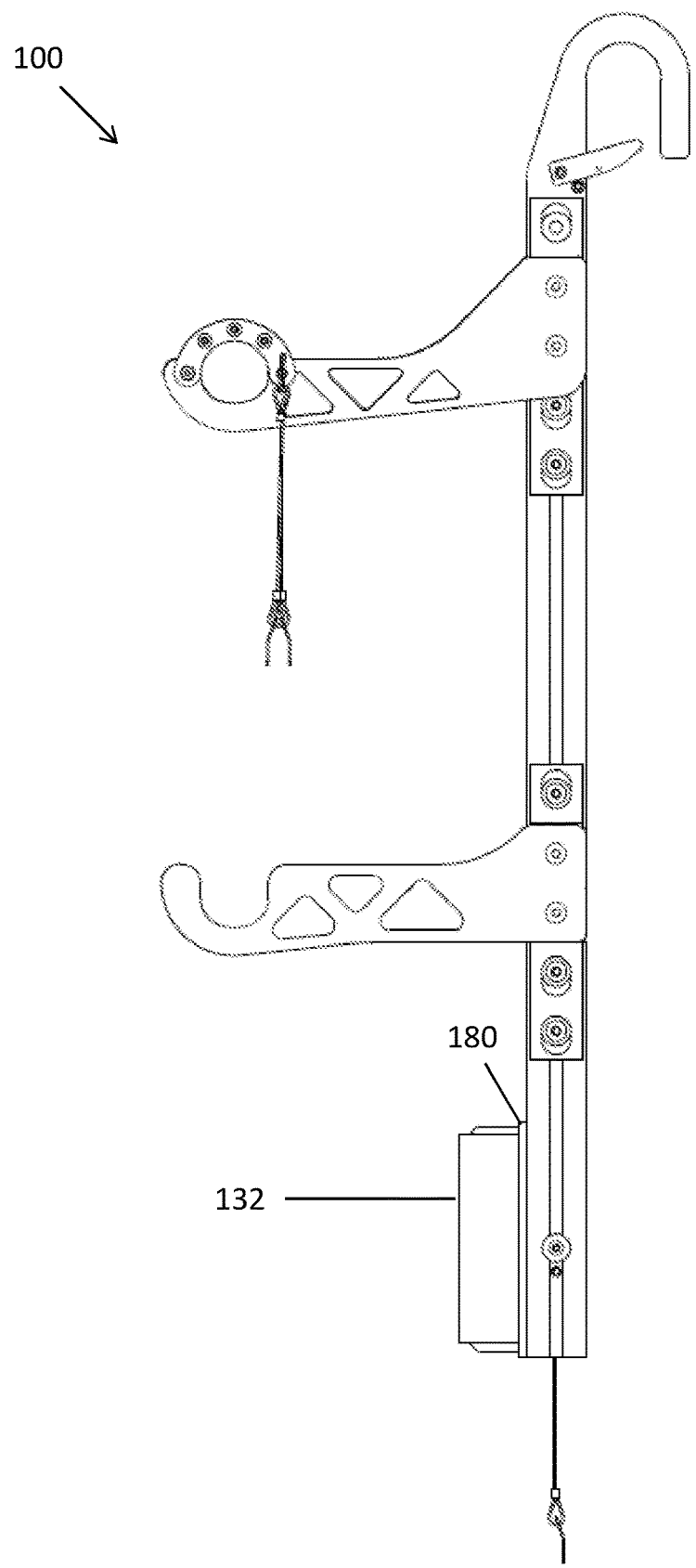
Figure 15:
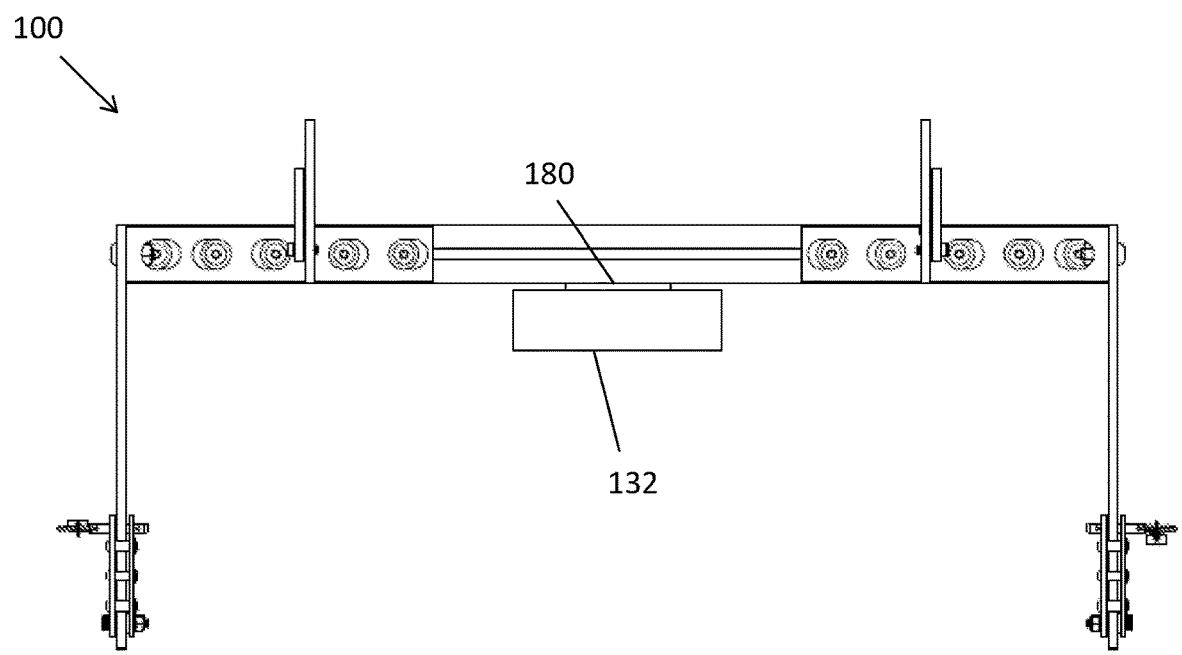
FIGS. 15 and 16 are top and bottom views, respectively, of the assembly, speaker, and bracket shown in FIG. 9.
Figure 16:
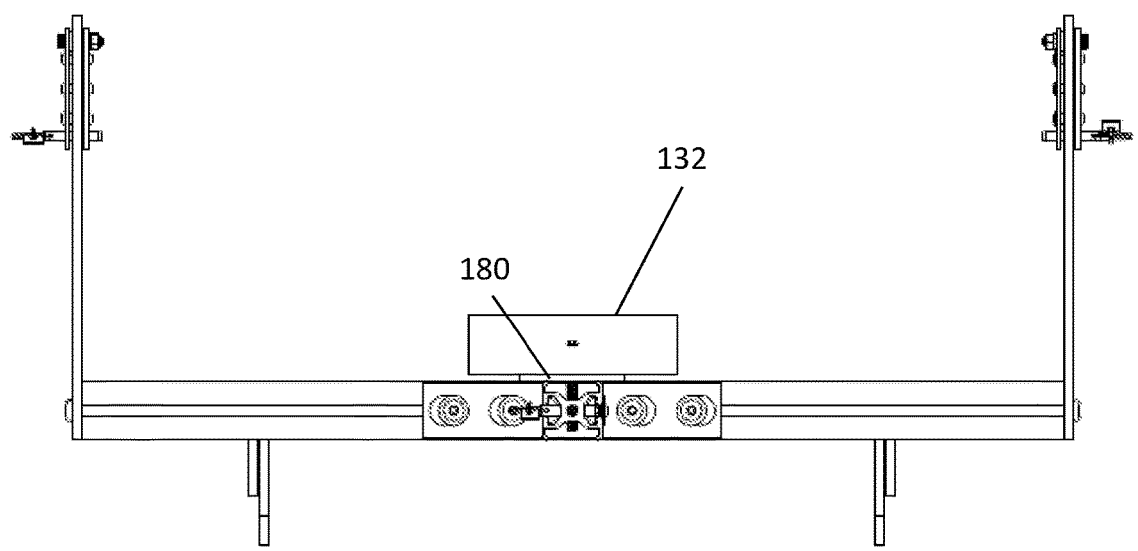

With continued reference to FIGS. 1 and 2, the assembly 100 generally includes upper and lower vertical supports, members, or arms 141, 142, an upper horizontal support, member, or arm 144, and a lower horizontal support, member, or arm 146. By way of example, the arms 141, 142, 144, and 146 may comprise extruded parts or extrusions (e.g., extruded aluminum, etc.) having T-slotted profiles, such as shown in FIGS. 22, 26, 27, and 29, etc.

The lower horizontal arm 146 includes opposing upper and lower (or top and bottom) sides that respectively define upper and lower horizontally-extending slots 147. The upper and lower vertical arms 141, 142 are slidably coupled to the lower horizontal arm 146 such that the upper and lower vertical arms 141, 142 are horizontally slidable along the respectively upper and lower horizontally-extending slots 147. Accordingly, the upper and lower vertical arms 141, 142 may be slidably positioned at a center location or at an off-center (e.g., right or left of center, etc.) location along the lower horizontal arm 146 depending on the particular handrail configuration and/or the presence of any obstructions near the site at which the assembly 100 will be installed.

The upper horizontal arm 144 includes opposing upper and lower (or top and bottom) sides that respectively define upper and lower horizontally-extending slots 145. The upper vertical arm 141 is slidably coupled to the upper horizontal arm 144 such that the upper vertical arm 141 is horizontally slidable along the lower horizontally-extending slot 145. Accordingly, the upper vertical arm 141 may be slidably positioned at a center location or at an off-center (e.g., right or left of center, etc.) location along the upper horizontal arm 144 depending on the particular handrail configuration and/ or the presence of any obstructions near the site at which the assembly 100 will be installed.

The sliding adjustability of the arms 141, 142, 144, 146 may help to account for a wide variety of locomotive handrails and obstructions near the site at which assembly 100 will be installed. By way of example, the arms 142, 144, 146 may be slidably coupled by using brackets 149, mechanical fasteners 150, and self-aligning T-nuts with ball springs.

Upper hook members 148 (broadly, support members) are respectively coupled (e.g., mechanically fastened, etc.) to opposing end portions of the upper horizontal arm 144. Lower hook members 152 (broadly, support members) are respectively coupled (e.g., mechanically fastened, etc.) to opposing end portions of the lower horizontal arm 146.

Each upper hook member 148 has a free end portion including or defining a hook 154. A locking bar or member 156 is pivotably coupled to the upper hook member 148 for pivotable movement relative to the hook 154 between an open position (FIG. 17) and a closed position (FIG. 1). A pin 158 (e.g., a quick release pin, etc.) is insertable into aligned openings defined by the locking bar 156 and upper hook member 148 to secure the locking bar 156 in the closed position. A lanyard 160 (e.g., keyring, cable, and pull-tab, etc.) is coupled to the pin 158 to allow for easier removal of the pin 158 from the aligned openings defined by the locking bar 156 and upper hook member 148.

Each lower hook member 152 has a free end portion including or defining a hook 162. As shown in FIGS. 17, 19, 34, and 35, the upper and lower hooks 154 and 162 are configured to engagingly receive respective upper and lower members 164, 166 (e.g., rods, cylindrical members, protruding supports, etc.) extending outwardly from opposing sides of the enclosure 104 when the enclosure 104 is mounted or installed onto the assembly 100.

After the assembly 100 has been installed onto the locomotive handrailing 116 as disclosed herein, the enclosure 104 may be lifted relative to the assembly 100 to thereby position the enclosure's upper and lower members 164, 166 within the corresponding upper and lower hooks 154, 162. After the upper members 164 have been engagingly received within the corresponding upper hooks 154, the locking bars 156 may be pivoted relative to the corresponding hook 154 from the open position to the closed position in which the locking bars 156 are positioned generally over the corresponding upper members 164. The pins 158 may then be inserted into the aligned openings of the corresponding locking bar 156 and upper hook member 148 to thereby secure and retain the locking bars 156 in place over the upper members 164, thereby preventing the upper members 156 from being unintentionally removed or dislodged from the hooks 154.

To remove the enclosure 104 from the assembly 100, each pin 158 may be removed from the aligned openings of the corresponding locking bar 156 and upper hook member 148 via the lanyard 160. After the pins 158 have been removed, the locking bars 156 may be pivoted relative to the corresponding upper hook 154 from the closed position to the open position. Thereafter, the enclosure 104 may be lifted upwards relative to the assembly 100 to thereby remove the enclosure's upper and lower members 164, 166 from the corresponding upper and lower hooks 154, 162.

With further reference to FIGS. 1 and 2, the assembly 100 includes a pair of top mounting hooks 168 configured to be positioned over (e.g., hooked onto, etc.) locomotive handrailing 116. A retaining bar 170 is rotatably coupled to each hook 168 such that the retaining bar 170 is rotatable between an open position and a closed position (FIG. 1). A spring may be provided for biasing the retaining bar 170 in the closed position. In the closed position, the retaining bar 170 may help to secure and retain the hook 168 onto the locomotive handrailing 116, thereby preventing the hook 168 from being unintentionally unhooked from the locomotive handrailing 116.

The hooks 168 are slidably coupled to the upper horizontal arm 144 such that the hooks 168 are horizontally slidable along the horizontally-extending slot 145 defined along the top side of the upper horizontal arm 144. Accordingly, the width between the hooks 168 may be slidably adjusted as the hooks 168 are slidably moved along the upper horizontal arm 144 closer or farther away from each other depending on the particular handrail configuration and/or presence of any obstructions near the site at which the assembly 100 will be installed.

The sliding width adjustability of the hooks 168 may thus help to account for a wide variety of locomotive handrails and obstructions near the site at which assembly 100 will be installed. By way of example, the hooks 168 may be slidably coupled to the upper horizontal arm 144 using brackets 172, mechanical fasteners 174, and self-aligning T-nuts with ball springs.

Also shown in FIGS. 1 and 2 are a pin 176 and a lanyard 178 (e.g., keyring, cable, and pull-tab, etc.). The pin 176 is slidably coupled to the lower vertical arm 142 such that the pin 176 is vertically slidable along the vertically-extending slots 143 defined by the lower vertical arm 142. Accordingly, the pin 176 may be slidably positioned at various higher or lower locations along the lower vertical arm 142. The pin 176 and lanyard 178 may be used to tether the lower vertical arm 142 to a railing stanchion on the locomotive 120, which may help prevent the assembly 100 from swinging outwardly away (e.g., forward if mounted on the front of the locomotive, etc.) from the locomotive handrailing during braking and coupling.

FIGS. 9 through 17 illustrate an exemplary speaker 132 mounted to the assembly 100 via an exemplary speaker bracket 180 according to an exemplary embodiment. The speaker 132 is an example only as the assembly 100 may also be used with other speakers in alternative exemplary embodiments.

As shown in FIG. 1, the lower vertical arm 142 includes three vertically aligned fastener holes 182. Thus, three mechanical fasteners (e.g., screws, etc.) may be used to couple the speaker bracket 180 to the lower vertical arm 142. The speaker bracket 180 includes four fastener holes 184 (FIG. 12) each adjacent a corresponding corner of the speaker bracket 180. Thus, four mechanical fasteners (e.g., screws, etc.) may be used to couple the speaker 132 to the speaker bracket 180. Alternatively, the speaker bracket 180, speaker 132, and lower vertical arm 142 may be configured differently in other embodiments, such as being configured to be coupled via other means besides mechanical fasteners and/or with more or less mechanical fasteners.

Figure 39:
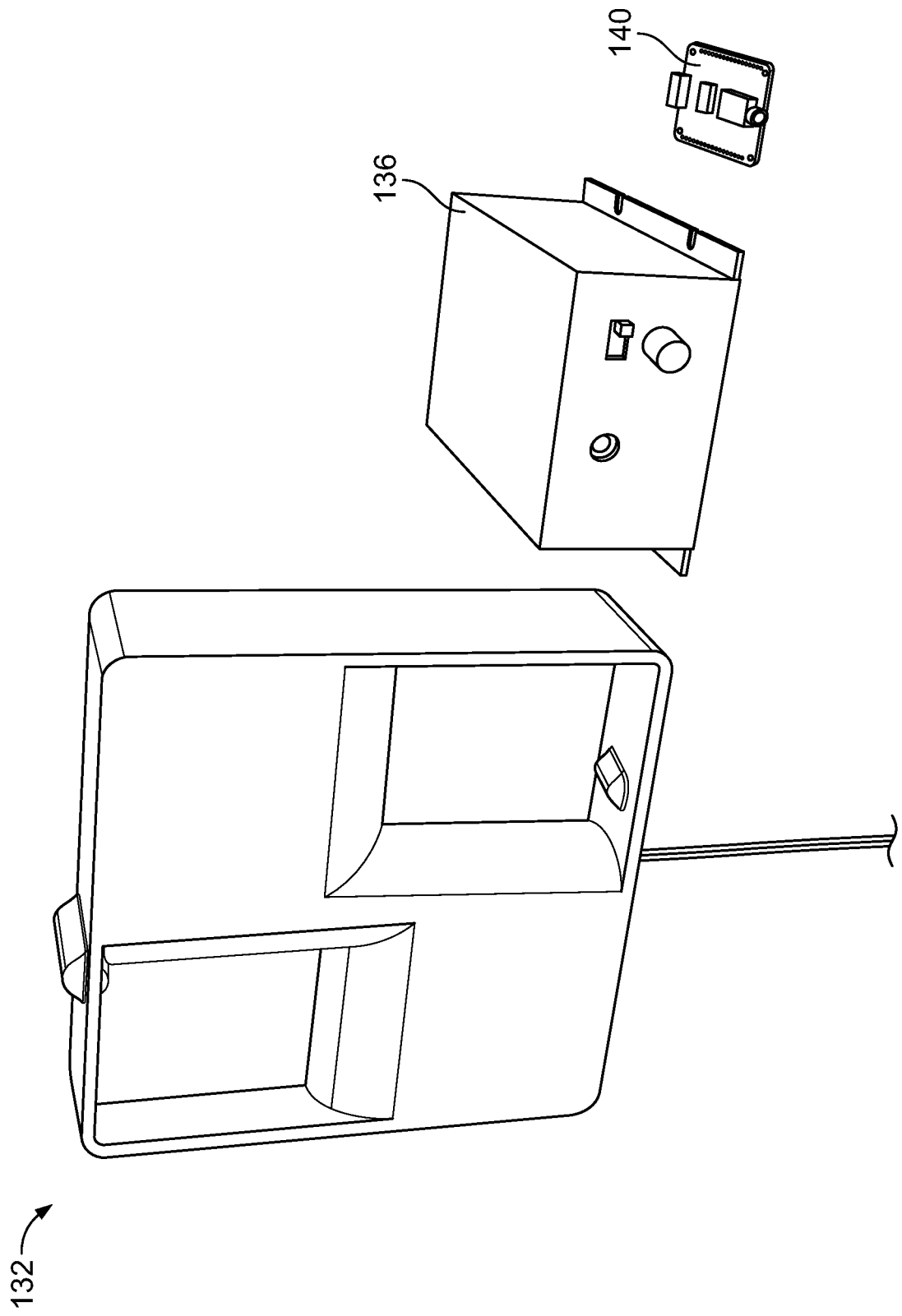
FIG. 39 illustrates an exemplary outdoor speaker, an audio amplifier, and an audio file player that may be used with an audible alert system according to an exemplary embodiment. The audio amplifier and the audio file player may be internal to a speaker enclosure that is mounted to locomotive handrailing by the assembly shown in FIG. 37.

The speaker 132 may be part of an audible alert system for a locomotive. For example, FIG. 39 illustrates components of an audible alert system according to an exemplary embodiment embodying one or more aspects of the present disclosure. As shown in the FIG. 39, the audible alert system includes an outdoor speaker 132, an audio amplifier 136, and an audio file player 140 that may be used with an audible alert system. The audio amplifier 136 and the audio file player 140 are housed within an environmentally sealed enclosure, which provides protection from the environment.

The speaker 132 may be lower in weight than and may replace the traditional pneumatic air horn and pneumatic bell on a locomotive. The audible alert system, including the speaker 132, may provide the ability to program multiple sounds and modernize a pneumatic air horn while maintaining overall sound quality. The speaker 132 may be located on the front or back of a locomotive. The speaker 132 may be mounted or installed on a locomotive in various ways. For example, the assembly 100 may be used to install the speaker 132 to locomotive handrailing 116 on a front of the locomotive 120 as shown in FIGS. 18, 19, 36, and 37. Or, for example, the speaker 132 may be fixedly mounted (e.g., bolted, mechanically fastened, etc.) to handrailing of a locomotive by using mechanical fasteners, etc. But exemplary embodiments of audible alert systems, including the speakers, disclosed herein should not be limited to any single method of mounting the audible alert system, including the speaker, to a locomotive.

Figure 33:
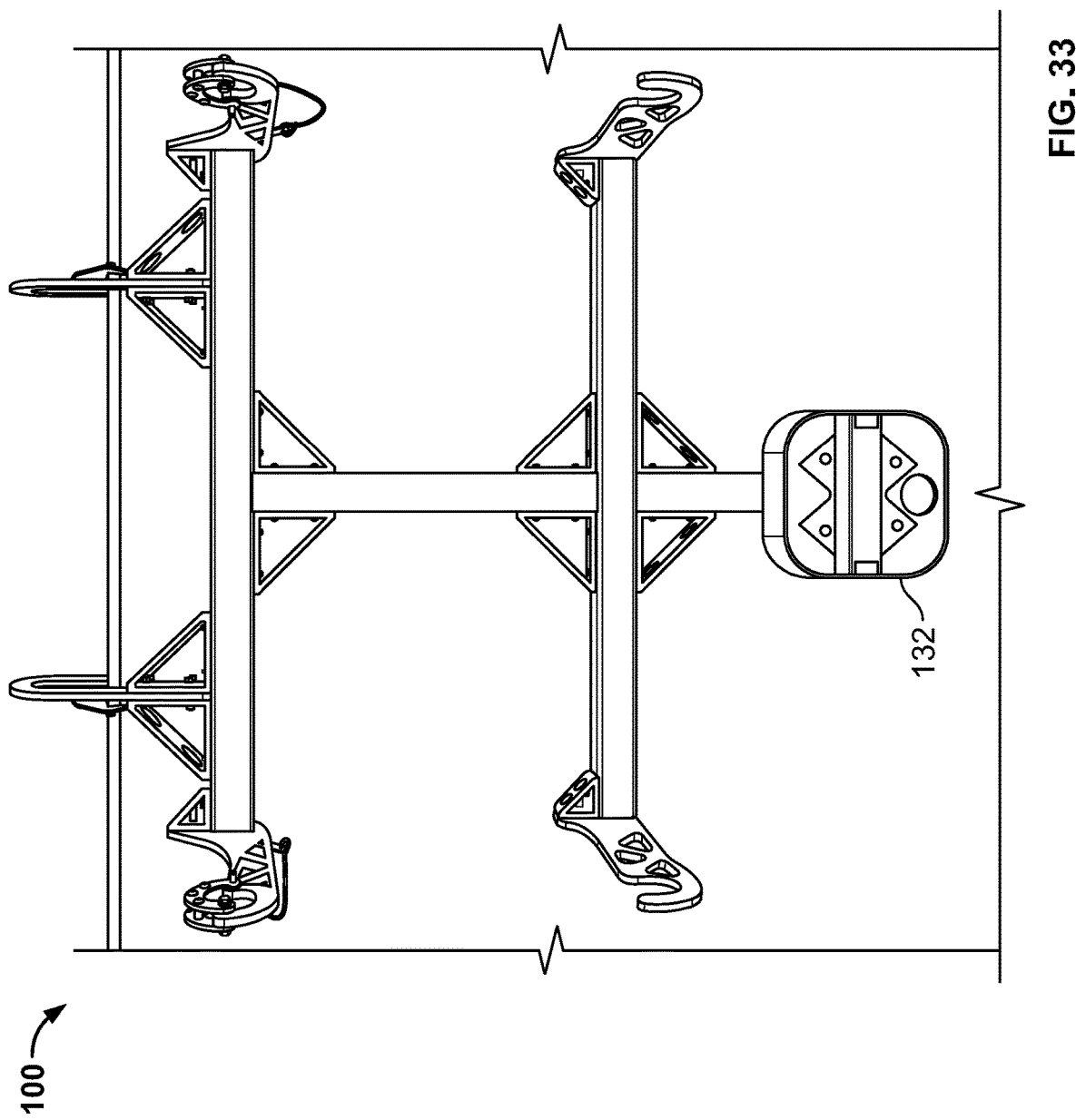
FIG. 33 illustrates an assembly that may be used for mounting a portable RCL system to handrailing of a locomotive according to an exemplary embodiment.
Figure 34:
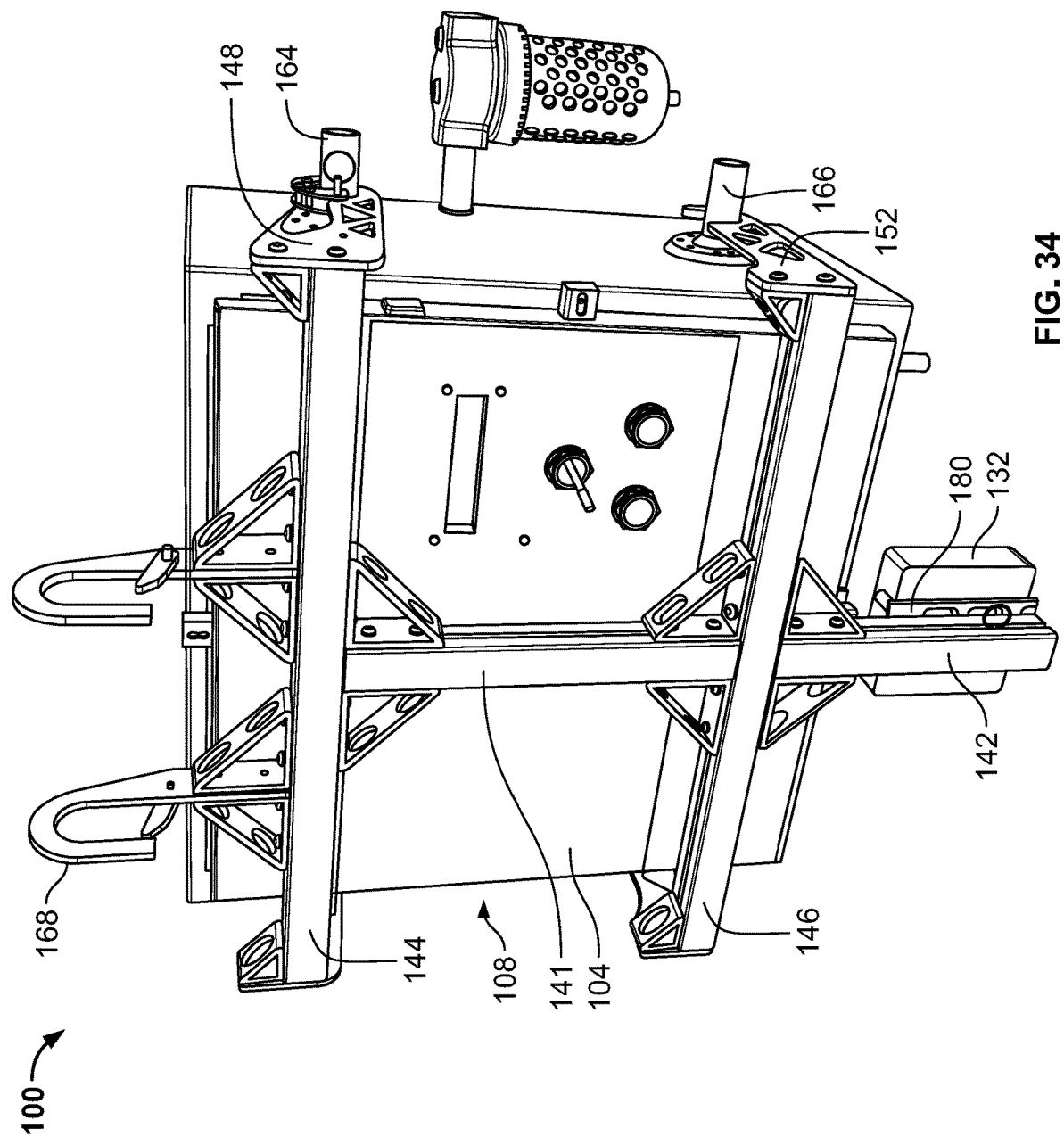
FIGS. 34 and 35 illustrate an exemplary portable RCL system including an enclosure mounted onto the assembly shown in FIG. 33.
Figure 35:
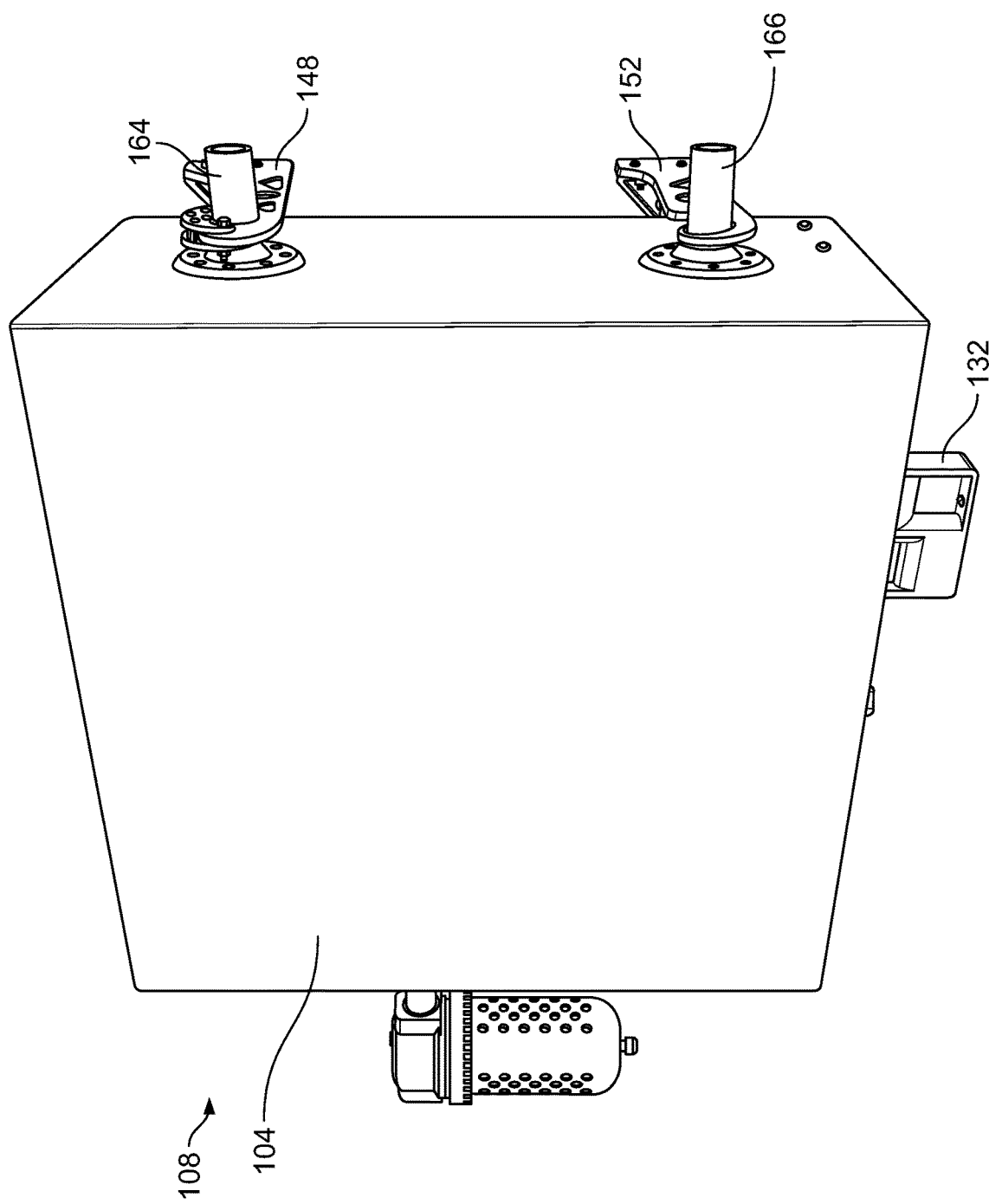
Figure 38:
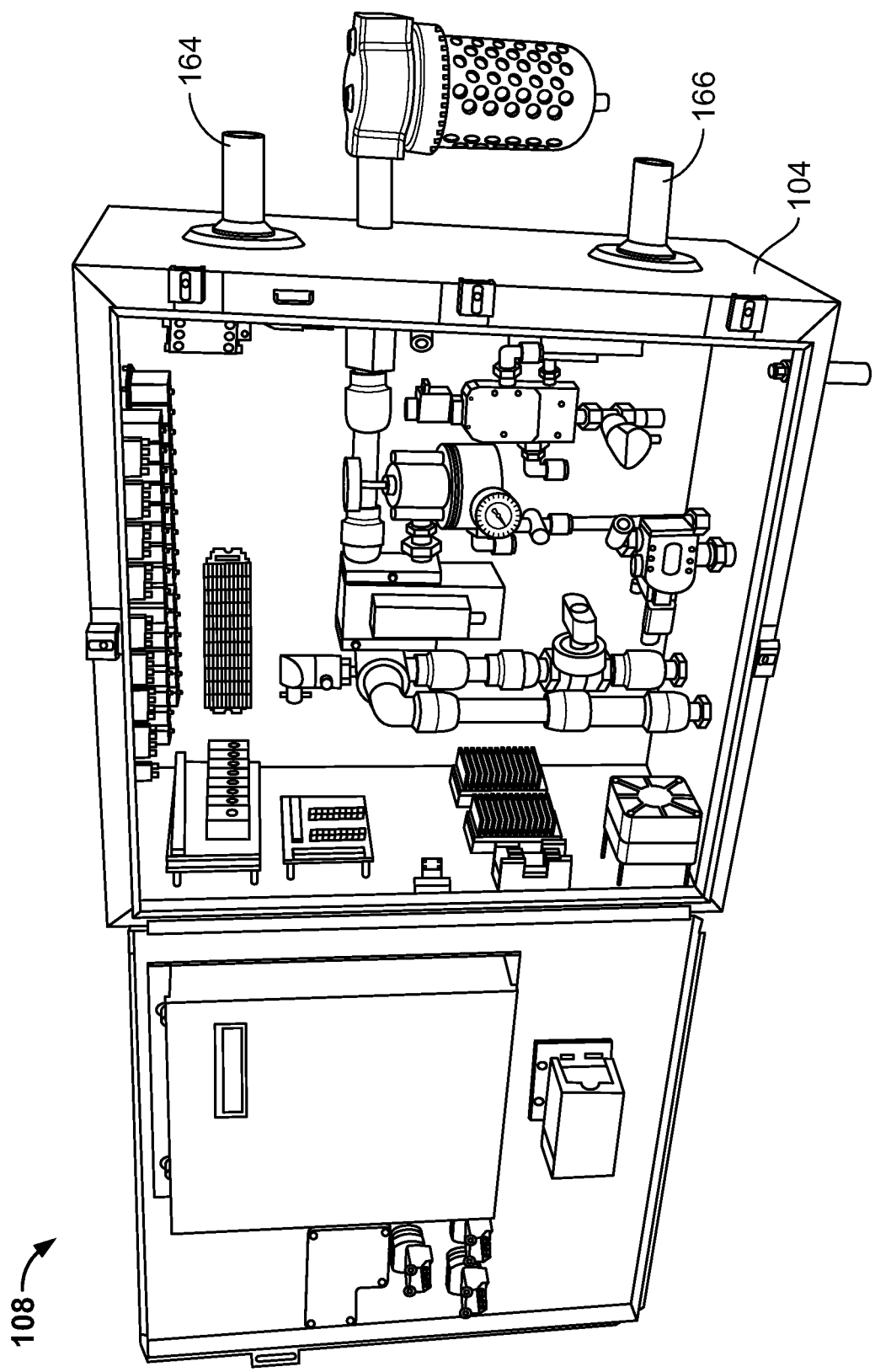
FIG. 38 illustrates exemplary components of the portable RCL system shown in FIGS. 34 and 35 after the enclosure has been opened.

The audible alert system, including the speaker 132, may be used with a portable remote control locomotive (RCL)

system. For example, FIGS. 34 and 35 illustrate an example portable remote control locomotive (RCL) system 108 that may be mounted onto an assembly 100 above the speaker 132 shown in FIGS. 33 and 39. The portable RCL system 108 and its components shown in FIG. 38 are examples only as the audible alert system may also be used with other portable RCL systems in alternative exemplary embodiments.

The audible alert system may be direct current (DC) powered and energy efficient. The speaker 132 may comprise a 100 Watts, 12 volts direct current (VDC) speaker having a relatively thin or slim profile. Alternatively, the audible alert system may include a speaker having a different configuration (e.g., higher or lower than 100 Watts, higher or lower than 12 VDC, etc.) in alternative exemplary embodiments.

Advantageously, the audio alert system may allow for reduced cost, complexity, and labor to include safety sounding devices onboard locomotives. The audio alert system may also provide integrated audio (voice and tones) and future capabilities to broadcast voice messages.

FIGS. 17, 18, and 19 illustrate the assembly 100 being used to mount the enclosure 104 of the portable RCL system 108 to the locomotive handrailing 116 according to an exemplary embodiment. The portable RCL system 108 and enclosure 104 are examples only as the assembly 100 may also be used with other portable RCL systems and enclosures in alternative exemplary embodiments.

FIG. 38 illustrates exemplary components of the portable RCL system 108 (FIGS. 34 and 35) after the enclosure 104 has been opened. By way of example, the enclosure 104 of the portable RCL system 108 may be configured to securely contain the hardware and components of the RCL system 108. The enclosure 104 may be configured with sufficient ruggedness and durability to withstand and thrive in the harsh environment of rail operations. The outer casing of the enclosure 104 may comprise a durable exterior that protects the components of the portable RCL system 108 from wear and tear. The portable RCL system 108 may be a lightweight, compact system that houses all hardware and components in the single enclosure 104, which may allow for easier troubleshooting and less likelihood of failure. The lightweight, single enclosure system design may also make it physically easier and safer for the portable RCL system 108 to be switched from one locomotive to the other.

In exemplary embodiments, one or more components may include or be provided with (e.g., stamped, etc.) openings to reduce the amount of material, thereby reducing the weight. For example, the brackets 149, 172 and upper and lower hook members 148, 152 (FIGS. 1 and 2) may include triangular shaped openings to reduce an overall weight of the assembly 100. In addition, the speaker bracket 180 may also include triangular shaped openings (e.g., FIGS. 20 and 30, etc.) to reduce an overall weight of the assembly 100.

FIGS. 20 through 32 illustrate an exemplary embodiment of a quick connect mounting cradle assembly (broadly, an assembly) embodying one or more aspects of the present disclosure. The assembly may be used for mounting an enclosure of a portable remote control locomotive (RCL) system (e.g., portable RCL shown in FIGS. 34-36 and 38, etc.) to handrailing of a locomotive. The assembly may also, or instead, be used for mounting a speaker (e.g., speaker shown in FIGS. 33-37 and 39, etc.) to handrailing of a locomotive. The portable RCL system and speaker shown in the figures are examples only as the assembly shown in FIGS. 20 through 32 may also be used with other portable RCL systems and/or speakers in alternative exemplary embodiments.

In FIGS. 20 through 32, items or parts of the assembly are identified with item reference numbers 1 through 32. Table 1 below provides a description for the items or parts, although exemplary embodiments disclosed herein may be used with other and/or additional items or parts. Accordingly, exemplary embodiments disclosed herein should not be limited to use with only the items or parts as described in the table below.

TABLE 1

| ITEM/PART | DESCRIPTION | QUANTITY |
|---|---|---|
| 1 | Top Hook | 2 |
| 2 | Bottom Hook | 2 |
| 3 | Lock Bar | 2 |
| 4 | Retaining Bracket | 2 |
| 5 | Speaker Bracket | 1 |
| 6 | Mechanical Fastener | 8 |
| 8 | Spacer | 4 |
| 9 | Locknut, Insert | 4 |
| 10 | Locknut, Insert | 2 |
| 11 | Quick Release Pin, Ring Grip with Lanyard | 3 |
| 12 | Mechanical Fastener | 36 |
| 13 | Self-Aligning T-Nut with Ball Spring | 36 |
| 15 | Mechanical Fastener | 2 |
| 16 | Mechanical Fastener | 3 |
| 17 | Mechanical Fastener | 3 |
| 20 | Mechanical Fastener | 10 |
| 21 | Extrusion with T-Slotted Profile | 2 |
| 22 | Extrusion with T-Slotted Profile | 1 |
| 24 | Bracket, Gusseted Inside Corner, 2 hole | 4 |
| 25 | Bracket, Gusseted Inside Corner, 4 hole | 10 |
| 26 | Extrusion with T-Slotted Profile | 1 |
| 27 | Washer | 2 |
| 28 | Washer | 1 |
| 29 | Washer | 2 |
| 30 | Top Mounting Hook | 2 |
| 31 | Mechanical Fastener | 2 |
| 32 | Mechanical Fastener | 2 |

Accordingly, exemplary embodiments are disclosed herein of assemblies (e.g., a quick connect mounting cradle assembly, the assembly 100 shown in FIGS. 1 through 8, the assembly shown in FIGS. 20 through 32, etc.) that may be used for mounting (e.g., without the use of any tools, etc.) enclosures of portable RCL systems (e.g., FIGS. 17-19, 34-36, and 38, etc.) and/or speakers (e.g., FIGS. 9-17, 33-37, and 39, etc.) to locomotive handrailing. Also disclosed herein are exemplary embodiments of portable remote RCL systems mountable to locomotive handrailing by such assemblies. Additionally, disclosed herein are exemplary embodiments of audible alert systems including speakers mountable to locomotive handrailing by such assemblies.

Exemplary embodiments include systems that include an assembly and a portable RCL system. In such embodiments, the system components are configured such that the assembly is usable for mounting the portable RCL system to locomotive handrailing.

Exemplary embodiments include systems that include an assembly and a speaker of an audible alert system. In such embodiments, the system components are configured such that the assembly is usable for mounting the speaker to locomotive handrailing.

Exemplary embodiments include systems that include an assembly, a portable RCL system, and a speaker of an audible alert system. In such embodiments, the system components are configured such that the assembly is usable for mounting the portable RCL system and the speaker to locomotive handrailing.

Also disclosed are exemplary methods of mounting assemblies (e.g., a quick connect mounting cradle assembly, the assembly 100 shown in FIGS. 1 through 8, the assembly shown in FIGS. 20 through 32, etc.) to locomotive handrailing substantially as disclosed herein. In exemplary embodiments, the assembly may comprise a quick connect mounting cradle assembly, and the method may comprise mounting the quick connect mounting cradle assembly to the locomotive handrailing without using any tools.

In exemplary embodiments, the method may comprise mounting the assembly to the locomotive handrailing, and thereafter mounting a portable remote control locomotive system to the assembly previously mounted to the locomotive handrailing.

In exemplary embodiments, the method may comprise mounting the portable remote control locomotive system mounting to the assembly without using any tools.

In exemplary embodiments, the method may further comprise mounting a speaker to the assembly before or after mounting the assembly to the locomotive handrailing.

In exemplary embodiments, the method may comprise mounting a speaker to the assembly; mounting the assembly to the locomotive handrailing without using any tools; and mounting the portable remote control locomotive system to the assembly without using any tools.

Accordingly, exemplary embodiments disclosed herein may provide or include one or more (but not necessarily any or all) of the following advantages or features, such as installation requiring no tools, mounting hooks that are adjustable for different hand rail configurations, lightweight, compact, fast installation, integrated audio (voice and tones), and/or portability. In exemplary embodiments, quick connect features allow a portable RCL system to be relatively easily and efficiently moved from locomotive to locomotive.

The portability provided by exemplary embodiments disclosed herein may enable greater flexibility when planning for maintenance and/or allow for less investment or improve rail operators' capital investment by eliminating per locomotive cost requirements. As compared with a traditional fixed mount system, exemplary embodiments disclosed herein may provide an economical solution that shifts upfront capital investments on a per locomotive basis across multiple locomotives giving added financial flexibility.

With exemplary embodiments disclosed herein, disruption caused by unplanned downtime may be reduced because the assembly and RCL system may be quickly and easily switched from one locomotive to another. For the same reason, it also provides greater flexibility when preparing for planned maintenance.

Exemplary embodiments are disclosed herein of audible alert systems (e.g., the audible alert system shown in FIG. 39, etc.). Exemplary embodiments include systems comprising an audible alert system and a portable RCL system.

Exemplary embodiments include systems comprising an audible alert system and an assembly (e.g., a quick connect mounting assembly, etc.) mountable to handrailing of a locomotive. In such embodiments, the system components are configured such that the assembly is usable for mounting a speaker of the audible alert system to locomotive handrailing.

Exemplary embodiments include systems comprising an audible alert system, a portable RCL system, and an assembly mountable to handrailing of a locomotive. In such embodiments, the system components are configured such that the assembly is usable for mounting the portable RCL system and a speaker of the audible alert system to locomotive handrailing.

Also disclosed are exemplary methods of providing an audible alert system (e.g., the audible alert system shown in FIG. 39, etc.) onboard a locomotive. The audible alert system may comprise an outdoor speaker, an audio amplifier, an audio file player, and an enclosure. The audio amplifier and the audio file player may be within the enclosure.

In exemplary embodiments, the method may comprise housing the audio amplifier and the audio file player of the audible alert system within an environmentally sealed enclosure, which provides protection for the audio amplifier and the audio file player from the environment.

In exemplary embodiments, the enclosure may comprise an environmentally sealed enclosure configured to provide protection for the audio amplifier and the audio file player from the environment. The audible alert system may be configured to be direct current (DC) powered. The speaker comprises a 100 Watts, 12 volts direct current (VDC) speaker. The audible alert system may be configured to provide integrated audio including voices and tones. The audible alert system may be configured to broadcast voice messages.

In exemplary embodiments, the method may include using the audible alert system instead of and/or as a replacement for a pneumatic air horn and a pneumatic bell onboard the locomotive.

In exemplary embodiments, the method may include mounting the outdoor speaker of the audible alert system to handrailing of the locomotive. Mounting the speaker of the audible alert system to handrailing of the locomotive may comprise: mounting a quick connect mounting assembly to handrailing of the locomotive without using any tools; and mounting the speaker of the audible alert system to the quick connect mounting assembly before or after mounting the quick connect mounting assembly to the handrailing of the locomotive.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising a portable remote control locomotive system and an assembly mountable to locomotive handrailing, the assembly comprising an upper horizontal arm and first and second hooks downwardly facing and configured to be hooked over and onto the locomotive handrailing, the first and second hooks slidably coupled to the upper horizontal arm, whereby the first and second hooks are horizontally slidable relative to each other along an upper surface of the upper horizontal arm to thereby allow adjustment to a distance separating the first and second hooks, wherein the system is configured such that the assembly is usable for mounting the portable remote control locomotive system to the locomotive handrailing.

2. The system of claim 1, wherein the assembly further comprises an upper vertical arm slidably coupled to the upper horizontal arm, whereby the upper vertical arm is horizontally slidable along a lower surface of the upper horizontal arm to thereby allow the upper vertical arm to be slidably positionable at a center location or off-center location along the upper horizontal arm.

3. The system of claim 2, wherein the assembly further comprises a lower horizontal arm, wherein the upper vertical arm is slidably coupled to the lower horizontal arm, whereby the upper vertical arm is horizontally slidable along an upper surface of the lower horizontal arm to thereby allow the upper vertical arm to be slidably positionable at a center location or off-center location along the lower horizontal arm.

4. The system of claim 3, wherein the assembly further comprises a lower vertical arm slidably coupled to the lower horizontal arm, whereby the lower vertical arm is horizontally slidable along a lower surface of the lower horizontal arm to thereby allow the lower vertical arm to be slidably positionable at a center location or off-center location along the lower horizontal arm.

5. An assembly mountable to locomotive handrailing, the assembly comprising:
   an upper horizontal arm;
   first and second hooks downwardly facing and configured to be hooked over and onto the locomotive handrailing, the first and second hooks slidably coupled to the upper horizontal arm, whereby the first and second hooks are horizontally slidable relative to each other along an upper surface of the upper horizontal arm to thereby allow adjustment to a distance separating the first and second hooks;
   an upper vertical arm slidably coupled to the upper horizontal arm, whereby the upper vertical arm is horizontally slidable along a lower surface of the upper horizontal arm to thereby allow the upper vertical arm to be slidably positionable at a center location or off-center location along the upper horizontal arm;
   a lower horizontal arm, wherein the upper vertical arm is slidably coupled to the lower horizontal arm, whereby the upper vertical arm is horizontally slidable along an upper surface of the lower horizontal arm to thereby allow the upper vertical arm to be slidably positionable at a center location or off-center location along the lower horizontal arm;
   a lower vertical arm slidably coupled to the lower horizontal arm, whereby the lower vertical arm is horizontally slidable along a lower surface of the lower horizontal arm to thereby allow the lower vertical arm to be slidably positionable at a center location or off-center location along the lower horizontal arm;
   wherein:
      the upper horizontal arm includes upper and lower horizontally-extending slots along the upper and lower surfaces of the upper horizontal arm;
      the lower horizontal arm includes upper and lower horizontally-extending slots along the upper and lower surfaces of the lower horizontal arm;
      the first and second hooks are horizontally slidable along the upper horizontally-extending slot of the upper horizontal arm;
      the upper vertical arm is horizontally slidable along the lower horizontally-extending slot of the upper horizontal arm and the upper horizontally-extending slot of the lower horizontal arm; and
      the lower vertical arm is horizontally slidable along the lower horizontally-extending slot of the lower horizontal arm.

6. The assembly of claim 5, further comprising at least one or more of:
   brackets along opposite sides of each said first and second hooks and mechanical fasteners along opposite upper and lower sides of the upper horizontally-extending slot of the upper horizontal arm to thereby slidably couple the brackets and first and second hooks to the upper horizontal arm;
   brackets along opposite sides of the upper vertical arm and mechanical fasteners along opposite upper and lower sides of the lower horizontally-extending slot of the upper horizontal arm to thereby slidably couple the brackets and the upper vertical arm to the upper horizontal arm;
   brackets along opposite sides of the upper vertical arm and mechanical fasteners along opposite upper and lower sides of the upper horizontally-extending slot of the lower horizontal arm to thereby slidably couple the brackets and the upper vertical arm to the lower horizontal arm; and
   brackets along opposite sides of the lower vertical arm and mechanical fasteners along opposite upper and lower sides of the lower horizontally-extending slot of the lower horizontal arm to thereby slidably couple the brackets and the lower vertical arm to the lower horizontal arm.

7. An assembly mountable to locomotive handrailing, the assembly comprising:
   an upper horizontal arm;
   first and second hooks downwardly facing and configured to be hooked over and onto the locomotive handrailing, the first and second hooks slidably coupled to the upper horizontal arm, whereby the first and second hooks are horizontally slidable relative to each other along an upper surface of the upper horizontal arm to thereby allow adjustment to a distance separating the first and second hooks;
   an upper vertical arm slidably coupled to the upper horizontal arm, whereby the upper vertical arm is horizontally slidable along a lower surface of the upper horizontal arm to thereby allow the upper vertical arm to be slidably positionable at a center location or off-center location along the upper horizontal arm;
   a lower horizontal arm, wherein the upper vertical arm is slidably coupled to the lower horizontal arm, whereby the upper vertical arm is horizontally slidable along an upper surface of the lower horizontal arm to thereby allow the upper vertical arm to be slidably positionable at a center location or off-center location along the lower horizontal arm;
   first and second upper hook members respectively coupled to opposing first and second end portions of the upper horizontal arm, the first upper hook member including a first free end portion including a first upwardly facing hook, the second upper hook member including a second free end portion including a second upwardly facing hook, the first and second upwardly facing hooks of the first and second upper hook members configured to engagingly receive respective first and second upper members extending outwardly from opposing sides of an enclosure of a portable remote control locomotive system; and
   first and second lower hook members respectively coupled to opposing first and second end portions of the lower horizontal arm, the first lower hook member including a first free end portion including a first upwardly facing hook, the second lower hook member including a second free end portion including a second upwardly facing hook, the first and second upwardly facing hooks of the first and second lower hook members configured to engagingly receive respective first and second lower members extending outwardly from the opposing sides of the enclosure of the portable remote control locomotive system;
   whereby the enclosure is supported by the assembly when the first and second upper and lower members of the enclosure are engagingly received respectively within the first and second upwardly facing hooks of the first and second upper and lower hook members.

8. A system including the assembly of claim 7 and the enclosure of the portable remote control locomotive system having the first and second upper and lower members extending outwardly from the opposing sides of the enclosure.

9. An assembly mountable to locomotive handrailing, the assembly comprising:
an upper horizontal arm;
first and second hooks downwardly facing and configured to be hooked over and onto the locomotive handrailing, the first and second hooks slidably coupled to the upper horizontal arm, whereby the first and second hooks are horizontally slidable relative to each other along an upper surface of the upper horizontal arm to thereby allow adjustment to a distance separating the first and second hooks;
an upper vertical arm slidably coupled to the upper horizontal arm, whereby the upper vertical arm is horizontally slidable along a lower surface of the upper horizontal arm to thereby allow the upper vertical arm to be slidably positionable at a center location or off-center location along the upper horizontal arm;
a lower horizontal arm, wherein the upper vertical arm is slidably coupled to the lower horizontal arm, whereby the upper vertical arm is horizontally slidable along an upper surface of the lower horizontal arm to thereby allow the upper vertical arm to be slidably positionable at a center location or off-center location along the lower horizontal arm;
a lower vertical arm slidably coupled to the lower horizontal arm, whereby the lower vertical arm is horizontally slidable along a lower surface of the lower horizontal arm to thereby allow the lower vertical arm to be slidably positionable at a center location or off-center location along the lower horizontal arm;
wherein the lower vertical arm includes at least one vertically-extending slot, and the assembly further comprises a pin slidably coupled to the lower vertical arm such that the pin is vertically slidable along the at least one vertically-extending slot, and a lanyard coupled to the pin, whereby the pin and the lanyard are usable for tethering the lower vertical arm to a railing stanchion on the locomotive to inhibit the assembly from swinging outwardly away from the handrailing when mounted to the handrailing during braking and coupling of the locomotive.

10. The system of claim 2, wherein the assembly further comprises first and second upper hook members respectively coupled to opposing first and second end portions of the upper horizontal arm, the first upper hook member including a first free end portion including a first upwardly facing hook, the second upper hook member including a second free end portion including a second upwardly facing hook, the first and second upwardly facing hooks configured to engagingly receive respective first and second upper members extending outwardly from opposing sides of an enclosure of a portable remote control locomotive system.

11. An assembly mountable to locomotive handrailing, the assembly comprising:
an upper horizontal arm;
first and second hooks downwardly facing and configured to be hooked over and onto the locomotive handrailing, the first and second hooks slidably coupled to the upper horizontal arm, whereby the first and second hooks are horizontally slidable relative to each other along an upper surface of the upper horizontal arm to thereby allow adjustment to a distance separating the first and second hooks;
an upper vertical arm slidably coupled to the upper horizontal arm, whereby the upper vertical arm is horizontally slidable along a lower surface of the upper horizontal arm to thereby allow the upper vertical arm to be slidably positionable at a center location or off-center location along the upper horizontal arm;
first and second upper hook members respectively coupled to opposing first and second end portions of the upper horizontal arm, the first upper hook member including a first free end portion including a first upwardly facing hook, the second upper hook member including a second free end portion including a second upwardly facing hook, the first and second upwardly facing hooks configured to engagingly receive respective first and second upper members extending outwardly from opposing sides of an enclosure of a portable remote control locomotive system;
a first locking member pivotably coupled to the first upper hook member for pivotable movement relative to the first upwardly facing hook between an open position and a closed position; and
a second locking member pivotably coupled to the second upper hook member for pivotable movement relative to the second upwardly facing hook member between an open position and a closed position.

12. The assembly of claim 11, further comprising:
a first pin insertable into aligned openings defined by the first locking member and the first upper hook member to secure the first locking member in the closed position; and
a second pin insertable into aligned openings defined by the second locking member and the second upper hook member to secure the second locking member in the closed position.

13. The assembly of claim 12, further comprising:
a first lanyard coupled to the first pin to allow for easier removal of the first pin from the aligned openings defined by the first locking member and the first upper hook member; and
a second lanyard coupled to the second pin to allow for easier removal of the second pin from the aligned openings defined by the second locking member and the second upper hook member.

14. An assembly mountable to locomotive handrailing, the assembly comprising:
an upper horizontal arm;
first and second hooks downwardly facing and configured to be hooked over and onto the locomotive handrailing, the first and second hooks slidably coupled to the upper horizontal arm, whereby the first and second hooks are horizontally slidable relative to each other along an upper surface of the upper horizontal arm to thereby allow adjustment to a distance separating the first and second hooks;
a first retaining member rotatably coupled to the first hook such that the first retaining member is rotatable relative to the first hook between an open position in which the first retaining member allows the first hook to be hooked onto or removed from the locomotive handrailing, and a closed position in which the first retaining member secures and/or retains the first hook on the locomotive handrailing thereby inhibiting removal of the first hook from the locomotive handrailing; and
a second retaining member rotatably coupled to the second hook such that the second retaining member is rotatable relative to the second hook between an open position in which the second retaining member allows the second hook to be hooked onto or removed from the locomotive handrailing, and a closed position in which the second retaining member secures and/or retains the second hook on the locomotive handrailing thereby inhibiting removal of the second hook from the locomotive handrailing.

15. The assembly of claim 14, further comprising:
a first spring for biasing the first retaining member in the closed position; and
a second spring for biasing the second retaining member in the closed position.

16. An assembly mountable to locomotive handrailing, the assembly comprising an upper horizontal arm and first and second hooks downwardly facing and configured to be hooked over and onto the locomotive handrailing, the first and second hooks slidably coupled to the upper horizontal arm, whereby the first and second hooks are horizontally slidable relative to each other along an upper surface of the upper horizontal arm to thereby allow adjustment to a distance separating the first and second hooks, wherein the upper horizontal arm includes an upper horizontally-extending slot along the upper surface of the upper horizontal arm, and the assembly further comprises brackets along opposite sides of each said first and second hooks and mechanical fasteners along opposite upper and lower sides of the upper horizontally-extending slot of the upper horizontal arm to thereby slidably couple the brackets and the first and second hooks to the upper horizontal arm, whereby the first and second hooks are horizontally slidable along the upper horizontally-extending slot.

17. A system comprising a speaker and an assembly mountable to locomotive handrailing, the assembly comprising an upper horizontal arm and first and second hooks downwardly facing and configured to be hooked over and onto the locomotive handrailing, the first and second hooks slidably coupled to the upper horizontal arm, whereby the first and second hooks are horizontally slidable relative to each other along an upper surface of the upper horizontal arm to thereby allow adjustment to a distance separating the first and second hooks,
wherein the system is configured such that the assembly is usable for mounting the speaker to the locomotive handrailing.

18. A system comprising a portable remote control locomotive (RCL) system and a quick connect mounting assembly, wherein the system is configured such that the assembly is usable for mounting an enclosure of the portable remote control locomotive (RCL) system to locomotive handrailing without requiring use of tools, the assembly comprising:
an upper horizontal arm including opposing upper and lower surfaces;
a lower horizontal arm including opposing upper and lower surfaces;
an upper vertical arm slidably coupled to the upper and lower horizontal arms, whereby the upper vertical arm is horizontally slidable along the lower surface of the upper horizontal arm and the upper surface of the lower horizontal arm; and
a lower vertical arm slidably coupled to the lower horizontal arm, whereby the lower vertical arm is horizontally slidable along the lower surface of the lower horizontal arm.

19. A quick connect mounting assembly for mounting an enclosure of a portable remote control locomotive (RCL) system to locomotive handrailing without requiring use of tools, the assembly comprising:
an upper horizontal arm including opposing upper and lower surfaces;
a lower horizontal arm including opposing upper and lower surfaces;
an upper vertical arm slidably coupled to the upper and lower horizontal arms, whereby the upper vertical arm is horizontally slidable along the lower surface of the upper horizontal arm and the upper surface of the lower horizontal arm; and
a lower vertical arm slidably coupled to the lower horizontal arm, whereby the lower vertical arm is horizontally slidable along the lower surface of the lower horizontal arm;
wherein:
the upper horizontal arm includes a lower horizontally-extending slot along the lower surface of the upper horizontal arm;
the lower horizontal arm includes upper and lower horizontally-extending slots along the upper and lower surfaces of the lower horizontal arm;
the upper vertical arm is horizontally slidable along the lower horizontally-extending slot of the upper horizontal arm and the upper horizontally-extending slot of the lower horizontal arm; and
the lower vertical arm is horizontally slidable along the lower horizontally-extending slot of the lower horizontal arm.

20. A quick connect mounting assembly for mounting an enclosure of a portable remote control locomotive (RCL) system to locomotive handrailing without requiring use of tools, the assembly comprising:
an upper horizontal arm including opposing upper and lower surfaces;
a lower horizontal arm including opposing upper and lower surfaces;
an upper vertical arm slidably coupled to the upper and lower horizontal arms, whereby the upper vertical arm is horizontally slidable along the lower surface of the upper horizontal arm and the upper surface of the lower horizontal arm;
a lower vertical arm slidably coupled to the lower horizontal arm, whereby the lower vertical arm is horizontally slidable along the lower surface of the lower horizontal arm;
first and second upper hook members respectively coupled to opposing first and second end portions of the upper horizontal arm, the first upper hook member including a first free end portion including a first upwardly facing hook, the second upper hook member including a second free end portion including a second upwardly facing hook, the first and second upwardly facing hooks of the first and second upper hook members configured to engagingly receive respective first and second upper members extending outwardly from opposing sides of an enclosure of a portable remote control locomotive system; and
first and second lower hook members respectively coupled to opposing first and second end portions of the lower horizontal arm, the first lower hook member including a first free end portion including a first upwardly facing hook, the second lower hook member including a second free end portion including a second upwardly facing hook, the first and second upwardly facing hooks of the first and second lower hook members configured to engagingly receive respective first and second lower members extending outwardly from the opposing sides of the enclosure of the portable remote control locomotive system;

whereby the enclosure is supported by the assembly when the first and second upper and lower members of the enclosure are engagingly received respectively within the first and second upwardly facing hooks of the first and second upper and lower hook members.

21. The system of claim 18, wherein the assembly further comprises first and second hooks downwardly facing and configured to be hooked over and onto the locomotive handrailing; the first and second hooks slidably coupled to the upper horizontal arm, whereby the first and second hooks are horizontally slidable relative to each other along the upper surface of the upper horizontal arm.

* * * * *